US012728621B2

(12) United States Patent
Burns et al.

(10) Patent No.: US 12,728,621 B2
(45) **Date of Patent: *Sep. 8, 2026**

(54) LAYERED COMPOSITE ARTICLES AND METHODS OF MAKING SAME

(71) Applicant: Columbia Insurance Company, Omaha, NE (US)

(72) Inventors: James Burns, Rocky Face, GA (US); Tom Odum, Tunnel Hill, GA (US); Jay Vecsey, Canton, GA (US); Jean Briere, Ooltewah, TN (US); Derek Bass, Cartersville, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,054

(22) Filed: Jan. 24, 2024

(65) Prior Publication Data

US 2024/0157689 A1 May 16, 2024

Related U.S. Application Data

(63) Continuation of application No. 17/398,314, filed on Aug. 10, 2021, now Pat. No. 11,919,278, which is a (Continued)

(51) Int. Cl.

*B32B 5/26* (2006.01)
*B32B 5/02* (2006.01)

(Continued)

(52) U.S. Cl.

CPC .............. *B32B 5/266* (2021.05); *B32B 5/022* (2013.01); *B32B 7/12* (2013.01); *B32B 27/12* (2013.01);

(Continued)

(58) Field of Classification Search

CPC ...... E04F 13/0875–0878; E04F 13/075; E04F 13/077; E04F 13/0871–0873;

(Continued)

(56) References Cited

U.S. PATENT DOCUMENTS 3,856,602 A 12/1974 Colijn et al.
4,093,763 A * 6/1978 Hartmann ............. D04H 13/00 428/218

(Continued)

FOREIGN PATENT DOCUMENTS

CN 1809480 9/2011
DE 19723827 12/1998

(Continued)

OTHER PUBLICATIONS

Machine translation of JP 2003/291235 A, obtained from EspaceNet.*

(Continued)

*Primary Examiner* — Z. Jim Yang
(74) *Attorney, Agent, or Firm* — Ballard Spahr LLP

(57) ABSTRACT

Described is a method of making a densified fiber batt that includes the steps of: a) providing a fiber batt comprising a first plurality of fibers having a first melting point and a second plurality of fibers having a second melting point different from the first melting point; b) subjecting the fiber batt to heat, thereby producing a heated fiber batt; and c) after step b) subjecting the heated fiber batt to pressure in a static press, thereby forming a densified fiber batt having a first surface and an opposed second surface, wherein the densified fiber batt comprises at least 30% by weight of the first plurality of fibers being a plurality of multi-component fibers. Also disclosed is a layered composite article comprising such a fiber batt.

18 Claims, 4 Drawing Sheets

Related U.S. Application Data continuation of application No. 15/813,678, filed on Nov. 15, 2017.

(60) Provisional application No. 62/553,271, filed on Sep. 1, 2017, provisional application No. 62/422,308, filed on Nov. 15, 2016.

(51) Int. Cl.

| | |
|---|---|
| ***B32B 7/12*** | (2006.01) |
| ***B32B 27/12*** | (2006.01) |
| ***B32B 37/06*** | (2006.01) |
| ***B32B 37/10*** | (2006.01) |
| ***D04H 1/435*** | (2012.01) |
| ***D04H 1/541*** | (2012.01) |
| ***D04H 1/55*** | (2012.01) |
| ***D04H 3/16*** | (2006.01) |
| ***E04F 15/10*** | (2006.01) |
| *B32B 37/12* | (2006.01) |
| *B32B 37/18* | (2006.01) |
| *B32B 38/00* | (2006.01) |
| *B32B 38/04* | (2006.01) |
| *B32B 38/06* | (2006.01) |

(52) U.S. Cl.

CPC .............. *B32B 37/06* (2013.01); *B32B 37/10* (2013.01); *D04H 1/435* (2013.01); *D04H 1/5412* (2020.05); *D04H 1/55* (2013.01); *D04H 3/16* (2013.01); *E04F 15/107* (2013.01); *B32B 37/12* (2013.01); *B32B 37/182* (2013.01); *B32B 2038/008* (2013.01); *B32B 2038/042* (2013.01); *B32B 38/06* (2013.01); *B32B 38/145* (2013.01); *B32B 2255/10* (2013.01); *B32B 2262/0276* (2013.01); *B32B 2307/102* (2013.01); *B32B 2307/558* (2013.01); *B32B 2307/72* (2013.01); *B32B 2307/734* (2013.01); *B32B 2309/02* (2013.01); *B32B 2309/105* (2013.01); *B32B 2309/12* (2013.01); *B32B 2471/00* (2013.01)

(58) Field of Classification Search

CPC .......... E04F 13/18–185; E04F 15/02161–022; E04F 15/10–107; E04F 15/18–183; E04F 15/20–206; B32B 5/12; B32B 2471/00–04; B32B 5/022; B32B 5/08; B32B 5/22; B32B 5/24; B32B 5/26; B32B 5/265–273; B32B 5/279; D04H 1/54–565; D04H 3/14–166

See application file for complete search history.

(56) References Cited

U.S. PATENT DOCUMENTS

| | | | | |
|---|---|---|---|---|
| 4,828,910 | A | 5/1989 | Haussling | |
| 4,946,738 | A | 8/1990 | Chenoweth et al. | |
| 5,079,074 | A | 1/1992 | Steagall et al. | |
| 5,677,027 | A | 10/1997 | Masuda et al. | |
| 5,691,036 | A * | 11/1997 | Lin | B32B 5/06 442/57 |
| 6,220,388 | B1 | 4/2001 | Sanborn | |
| 6,490,828 | B1 | 12/2002 | Fuller et al. | |
| 7,015,157 | B2 * | 3/2006 | Takeda | B32B 27/08 442/389 |
| 7,055,649 | B2 | 6/2006 | Tompson et al. | |
| 7,318,498 | B2 | 1/2008 | Woodman et al. | |
| 7,816,001 | B2 | 10/2010 | Pohlmann | |
| 7,816,290 | B2 | 10/2010 | Erb et al. | |
| 8,039,091 | B2 | 10/2011 | Tilton et al. | |
| 8,480,916 | B2 | 7/2013 | Fernando et al. | |
| 8,920,915 | B2 | 12/2014 | Kunal et al. | |
| 9,434,206 | B2 | 9/2016 | Hoff | |
| 2002/0146954 | A1 | 10/2002 | Drees et al. | |
| 2003/0176131 | A1 | 9/2003 | Tilton | |
| 2003/0211799 | A1 | 11/2003 | Yao et al. | |
| 2004/0084129 | A1 * | 5/2004 | Wenstrup | D04H 1/593 442/338 |
| 2004/0192141 | A1 | 9/2004 | Yang et al. | |
| 2004/0231914 | A1 | 11/2004 | Thompson et al. | |
| 2005/0153098 | A1 | 7/2005 | Bhatnagar et al. | |
| 2006/0105154 | A1 | 5/2006 | Sutton | |
| 2006/0144012 | A1 | 7/2006 | Manning | |
| 2006/0194496 | A1 * | 8/2006 | Burns | B32B 7/12 442/268 |
| 2007/0039268 | A1 | 2/2007 | Ambrose | |
| 2008/0045101 | A1 * | 2/2008 | Near | B32B 5/26 442/361 |
| 2008/0057283 | A1 | 3/2008 | Blinkhorn | |
| 2008/0166533 | A1 | 7/2008 | Jones et al. | |
| 2009/0047465 | A1 | 2/2009 | Zafirogiu | |
| 2009/0117801 | A1 | 5/2009 | Flack | |
| 2009/0130939 | A1 | 5/2009 | Kimura | |
| 2009/0252941 | A1 * | 10/2009 | Mueller | D04H 1/4209 156/155 |
| 2009/0256345 | A1 | 10/2009 | Tanaka | |
| 2010/0021718 | A1 | 1/2010 | Vos et al. | |
| 2010/0107512 | A1 * | 5/2010 | Ellison | E04C 2/16 52/80.1 |
| 2010/0213002 | A1 | 8/2010 | Oboodi et al. | |
| 2010/0310838 | A1 * | 12/2010 | Ketzer | B32B 13/08 428/196 |
| 2011/0045724 | A1 | 2/2011 | Bahukudumbi | |
| 2012/0103722 | A1 | 5/2012 | Clausi | |
| 2012/0157904 | A1 * | 6/2012 | Stein | D04H 1/49 427/430.1 |
| 2012/0315816 | A1 * | 12/2012 | Fowler | B32B 5/022 264/129 |
| 2013/0011623 | A1 | 1/2013 | Jones | |
| 2013/0023176 | A1 | 1/2013 | Bradley et al. | |
| 2013/0130019 | A1 | 5/2013 | Pinto | |
| 2013/0333821 | A1 | 12/2013 | Hahn | |
| 2014/0272318 | A1 | 9/2014 | Lawrence | |
| 2014/0273705 | A1 | 9/2014 | Lawrence | |
| 2014/0349084 | A1 | 11/2014 | Patki et al. | |
| 2015/0008070 | A1 | 1/2015 | Caimi | |
| 2015/0140306 | A1 | 5/2015 | Endo | |
| 2016/0279914 | A1 | 9/2016 | Rose et al. | |
| 2017/0320287 | A1 | 11/2017 | Galle | |
| 2018/0002932 | A1 * | 1/2018 | Van Giel | C08J 9/0066 |
| 2019/0016087 | A1 | 1/2019 | Huang | |
| 2020/0055276 | A1 | 2/2020 | Katsuya | |
| 2021/0277654 | A1 | 9/2021 | Rho | |

FOREIGN PATENT DOCUMENTS

| | | | | |
|---|---|---|---|---|
| EP | 2003235 | A2 | 12/2008 | |
| JP | 2003291235 | A * | 10/2003 | |
| KR | 2008-0073884 | | 8/2008 | |
| KR | 2015-0092078 | | 8/2015 | |
| KR | 10-2016-0120277 | | 3/2018 | |
| RU | 2011113528 | | 10/2012 | |
| WO | WO 88/00258 | | 1/1988 | |
| WO | WO-96/01734 | | 1/1996 | |
| WO | WO-01/38073 | | 5/2001 | |
| WO | WO-2013/017375 | | 2/2013 | |
| WO | WO 2016/087573 | | 6/2016 | |
| WO | WO-2016/113378 | | 7/2016 | |
| WO | WO-2016113378 | A1 * | 7/2016 | B32B 27/00 |

OTHER PUBLICATIONS

"Trevira at Techtextil in Frankfurt 2015," Indorama Ventures, indoramaventures.com, Mar. 2015. http://www.indoramaventures.com/fibersandyarns/site-news/News.php.

International Search Report and Written Opinion mailed on Jan. 19, 2018 by the International Searching Authority for International Patent Application No. PCT/US2017/061775, which was filed on

(56) References Cited

OTHER PUBLICATIONS

Nov. 15, 20017 (Applicant—Shaw Industries Group, Inc.) (15 pages).

* cited by examiner

LAYERED COMPOSITE ARTICLES AND METHODS OF MAKING SAME

CROSS-REFERENCE TO RELATED APPLICATIONS

This application is a continuation of U.S. application Ser. No. 17/398,314, filed on Aug. 10, 2021, which is a continuation of U.S. application Ser. No. 15/813,678, filed on Nov. 15, 2017, which claims the benefit of priority to U.S. Provisional Application No. 62/422,308, filed on Nov. 15, 2016, and the benefit of priority to U.S. Provisional Application No. 62/553,271, filed on Sep. 1, 2017, all of which are incorporated herein by reference in their entirety.

BACKGROUND

Fiberboards, particularly medium-density fiberboards and high-density fiberboards, and plastic materials (such as PVC resins or other solid thermoplastic or thermoset polymers) are commonly used as core backing materials for floor coverings, wall coverings, and ceiling panels. For example, some existing floor panels generally consist of a chipboard core (such as an MDF or an HDF core), or a PVC core, which are covered (laminated) with a decor layer and a use surface or a finishing layer.

Laminated floors have also proven to be a visually appealing, economically priced, relatively light weight flooring material, which can also be installed by lay persons. Furthermore, they are correspondingly widely spread. However, these laminated floors typically have relatively high impact noise, low radiant panel ratings, and high environmental impact. Many attempts have thus been made to develop composite boards based on alternative materials.

There is still a need, however, to obtain composite boards which do not require a complex layer structure in order to achieve characteristics suitable for being used in heavy duty applications. Still further, there is a need to obtain composite boards having one or more of high impact strength, swell heat resistance, heat retardance, dimensional stability, acceptable radiant panel ratings, and improved acoustical properties (such as sound propagation) as compared to existing fiberboards or composite boards.

Still further, there is a need for methods that are capable of manufacturing such composite boards. These needs and other needs to be further described herein can be at least partially satisfied by one or more aspects of the present disclosure.

SUMMARY

The present invention is directed to a layered composite article that generally comprises a rigid backing portion, the rigid backing portion comprising a rigid core having a first surface and an opposed second surface, wherein the rigid core comprises at least one densified fiber batt and wherein the at least one densified fiber batt is comprised of a first plurality of oriented fibers having a first melting point and a second plurality of oriented fibers having a second melting point different from the first melting point. Further, the layered composite also comprises a decorative portion having a first surface and an opposed second surface, wherein the second surface of the decorative portion is affixed to the first surface of the rigid core.

In further aspects to be discussed in more detail below, at least one of the first and second pluralities of fibers comprises a multi-component fiber. In still further aspects, the multi-component fiber can comprise at least a first component having a first melting point and at least second component having a second melting point different from the first melting point. In still further aspects, the at least one densified fiber batt can further comprise a third plurality of oriented fibers comprising, for example, a natural fiber.

In another aspect, the present disclosure provides a layered composite article generally comprising a rigid backing portion wherein the rigid backing portion comprises a rigid core having a first surface and an opposed second surface. The rigid core further comprises at least one densified fiber batt wherein the at least one densified fiber batt is comprised of first plurality of oriented fibers comprising a natural fiber having a decomposition temperature and a second plurality of oriented fibers having a melting point lower than the decomposition temperature of the first plurality of oriented fibers. The layered composite further comprises a decorative portion having a first surface and an opposed second surface, wherein the second surface of the decorative portion is affixed to the first surface of the rigid core.

In still further aspects, disclosed herein is a layered composite article comprising a rigid backing portion, the rigid backing portion comprising a rigid core having a first surface and an opposed second surface, wherein the rigid core comprises at least one densified fiber batt and wherein the at least one densified fiber batt is comprised of a plurality of oriented multi-component fibers, wherein each of the plurality of oriented multi-component fibers comprises at least first component having a first melting point and at least second component having a second melting point different from the first melting point. This layered composite further comprises a decorative portion having a first surface and an opposed second surface, wherein the second surface of the decorative portion is affixed to the first surface of the rigid core.

In still another aspect, the present disclosure provides a method of making a layered composite article as disclosed herein generally comprising the step of forming a rigid backing portion comprising a rigid core having a first surface and an opposed second surface, wherein the rigid core comprises at least one densified fiber batt and wherein the at least one densified fiber batt is comprised of a first plurality of oriented fibers having a first melting point and a second plurality of oriented fibers having a second melting point different from the first melting point. The method further comprises forming a decorative portion having a first surface and an opposed second surface and affixing the second surface of the decorative portion to the first surface of the rigid core.

In yet another aspect, the present disclosure provides a method of making a layered composite article as disclosed herein generally comprising the step of forming a rigid backing portion comprising a rigid core having a first surface and an opposed second surface, wherein the rigid core comprises at least one densified fiber batt and wherein the at least one densified fiber batt is comprised of a plurality of oriented multi-component fibers, wherein each of the plurality of multi-component fibers comprises at least first component having a first melting point and at least second component having a second melting point different from the first melting point. The method further comprises forming a decorative portion having a first surface and an opposed second surface and affixing the second surface of the decorative portion to the first surface of the rigid core.

In still another aspect, the present disclosure provides a method of making a layered composite article as disclosed herein generally comprising the step of forming a rigid backing portion comprising a rigid core having a first surface and an opposed second surface, wherein the rigid core comprises at least one densified fiber batt and wherein the at least one densified fiber batt is comprised of a first plurality of oriented fibers comprising a natural fiber having a decomposition temperature and a second plurality of oriented fibers having a melting point lower than the decomposition temperature of the first plurality of oriented fibers. The method further comprises forming a decorative portion having a first surface and an opposed second surface and affixing the second surface of the decorative portion to the first surface of the rigid core.

In still further aspects, the step of forming the rigid backing portion can further comprise forming the rigid core by a method comprising overlaying the first plurality of oriented fibers and the second plurality of oriented fibers to form a fibrous matrix; treating or otherwise subjecting the fibrous matrix to conditions or process steps effective to form a fiber batt; and then heat and pressure treating the fiber batt under conditions effective to form the densified fiber batt.

Additional aspects of the disclosure will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION

Figure 1:
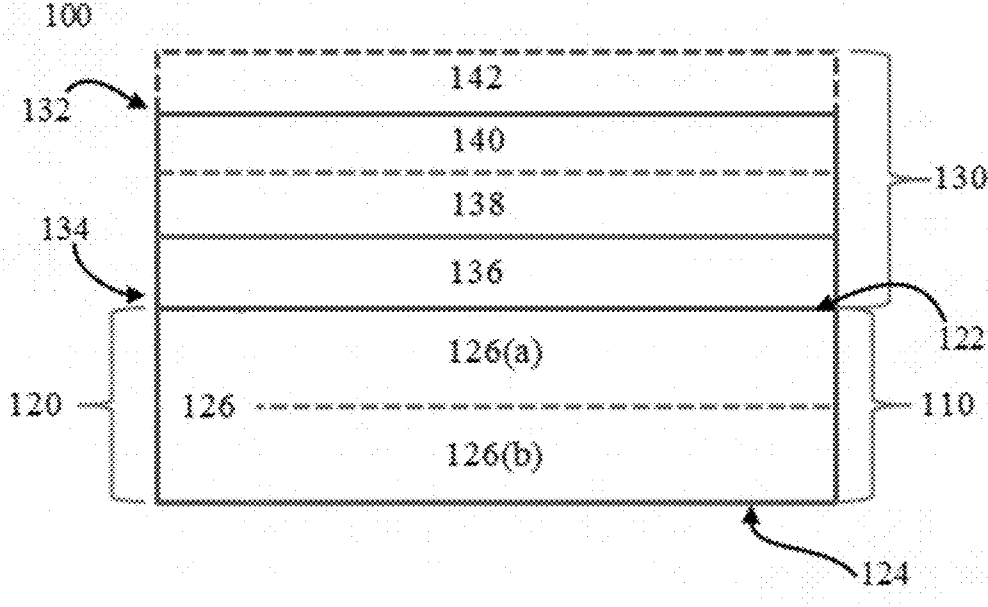
FIG. 1. is a schematic side view illustration of an exemplary layered composite floor covering as disclosed and described herein.

The present invention can be understood more readily by reference to the following detailed description, examples, drawings, and claims, and their previous and following description. However, before the present articles, systems, and/or methods are disclosed and described in further detail, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

As used herein, the singular forms “a,” “an” and “the” include plural referents unless the context clearly dictates otherwise. Thus, for example, reference to a “fiber” includes aspects having two or more such fibers unless the context clearly indicates otherwise.

As used herein, the term “comprising” can include the aspects “consisting of” and “consisting essentially of.” The term “comprising” can also mean “including but not limited to.”

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It should be further understood that the endpoints of each of the ranges are significant both in relation to the other endpoint, and independently of the other endpoint. Moreover, in still further aspects, reference to a parameter that equals a particular endpoint or specific value also includes aspects that are characterized as being greater than the stated value or, alternatively, less than the stated value.

As used herein, the terms “optional” or “optionally” mean that the subsequently described event or circumstance may or may not occur, and that the description includes instances where said event or circumstance occurs and instances where it does not.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

The term “fiber” as used herein includes fibers of extreme or indefinite length (i.e. filaments) and fibers of short length (i.e., staple fibers). It is further understood that the fiber described herein can be construed as comprising materials of virgin or recycled origin, or a combination of both. In certain aspects of this invention, the fiber comprises recycled materials, wherein the recycled materials include, but are not limited, to post-consumer or post-industrial materials, or a combination thereof. In yet other aspects, the fiber used in this invention comprises virgin materials.

The term “oriented fiber” as used herein is directed to the fiber orientation in a fiber batt or a fiber matrix.

The term “rigid core” refers to any composite material comprising a rigid core and that is capable of withstanding heavy duty applications, such as for example, heavy foot traffic, without any significant deformation of the board. Still further, in aspects of the disclosure, a rigid composite board can be defined functionally in that it at least substantially prevents telegraphing of hard surface subfloor structure irregularities, such as ripples and waves, to the decorative layer portion when the rigid composite floor covering is abutting the subfloor structure in the selected orientation.

As used herein, the term “polyester” refers to a category of polymers that contain the ester functional group in their main chain. Polyesters disclosed herein include naturally occurring chemicals, such as in the cutin of plant cuticles, as well as synthetics produced through step-growth polymerization. An non-limiting example of polyesters includes any long-chain synthetic polymer composed of at least 85% by weight of an ester of a substituted aromatic dicarboxylic acid, including but not restricted to substituted terephthalic units, p(-R—O—CO—$C_6H_4$—CO—O—)), and parasubstituted hydroxy-benzoate units, p(-R—O—CO—$C_6H_4$—O)$_x$. In certain examples, the polyesters comprise polyethylene terephthalate (PET) homopolymer and copolymers, polypropylene terephthalate (PPT) homopolymer and copolymers and polybutylene terephthalate (PBT) homopolymer and copolymers, and the like, including those that contain comonomers such as cyclohexanedimethanol, cyclohexanedicarboxylic acid, isophthalic acid, and the like.

The term “polyamide,” as utilized herein, is defined to be any long-chain polymer in which the linking functional groups are amide (—CO—NH—) linkages. The term polyamide is further defined to include copolymers, terpolymers and the like as well as homopolymers and also includes blends of two or more polyamides. In some aspects, the plurality of polyamide fibers comprise one or more of nylon 6, nylon 66, nylon 10, nylon 612, nylon 12, nylon 11, or any combination thereof. In other aspects, the plurality of polyamide fibers comprises nylon 6 or nylon 66. In yet other aspect, the plurality of polyamide fibers is nylon 6. In a yet further aspect, the plurality of polyamide fibers is nylon 66.

As defined herein, the term “polyolefin” refers to any class of polymers produced from a simple olefin (also called an alkene with the general formula $C_nH_{2n}$) as a monomer. In some aspects, the polyolefins include, but are not limited to, polyethylene, polypropylene, both homopolymer and copolymers, poly(l-butene), poly(3-methyl-1-butene), poly(4-methyl-1-pentene) and the like, as well as combinations or mixtures of two or more of the foregoing.

As defined herein, the term “polyurethane” refers to any class of polymers composed of a chain of organic units joined by carbamate (urethane, $R_1$—O—CO—$NR_2$—$R_3$, wherein R1, R2 and R3 are the same or different) links.

As defined herein, the term “polystyrene” refers to any class of synthetic polymers produced from a simple styrene as a monomer. It is understood that the term “polystyrene” includes both atactic and syndiotactic polystyrenes. In some specific aspects, described are also co-polystyrenes including a high-impact polystyrenes (HIPS), acrylonitrile butadiene styrene (ABS) or copolymer of styrene with acrylonitrile (SAN), or copolymer of styrene with maleic acid (SMA).

As defined herein, the term “acetal” refers to a functional group with the following connectivity of $R_2C(OR')_2$, wherein both R' groups can comprise hydrogen or organic fragments. The two R'O groups can be equivalent to each other (known as a symmetric acetal) or different (known as a mixed acetal).

As used herein, the term “substantially” can in some aspects refer to an amount or feature that is represented or otherwise quantified as being at least about 80%, at least about 85%, at least about 90%, at least about 91%, at least about 92%, at least about 93%, at least about 94%, at least about 95%, at least about 96%, at least about 97%, at least about 98%, at least about 99%, or even about 100% of the stated property, component, composition, or other condition for which substantially is used to characterize or otherwise quantify an amount.

In other aspects, as used herein, the term “substantially free,” when used in the context of a composition, or component of a composition that is substantially absent, is intended to refer to an amount that is less than about 1% by weight, e.g., less than about 0.5% by weight, less than about 0.1% by weight, less than about 0.05% by weight, or less than about 0.01% by weight of the stated material, based on the total weight of the composition.

As used herein, the term or phrase “effective,” “effective amount,” or “conditions effective to” refers to such amount or condition that is capable of performing the function or property for which an effective amount or condition is expressed. As will be pointed out below, the exact amount or particular condition required will vary from one aspect to another, depending on recognized variables such as the materials employed and the processing conditions observed. Thus, it is not always possible to specify an exact “effective amount” or “condition effective to.” However, it should be understood that an appropriate effective amount will be readily determined by one of ordinary skill in the art using only routine experimentation.

As used herein, and unless the context clearly indicates otherwise, the term “carpet” is used to generically include broadloom carpet, carpet tiles, area rugs, and even artificial grass (or turf). To that end, the term “broadloom carpet” refers to a broadloom textile flooring product manufactured for and intended to be used in roll form. The term “carpet tile” refers to a modular floor covering, conventionally manufactured in 18"×18," 24"×24" or 36"×36" squares, but other sizes and shapes are also within the scope of the present invention. Any of these exemplary carpets can be woven, non-woven, tufted, or needle-punched.

As used herein, the term “reclaimed fiber” includes a fiber reclaimed from a new product, post-industrial product, manufacturing remnants, quality control discarded or rejected material, or a post-consumer product. In some exemplary aspects, such products comprise carpets or carpet tiles.

As used herein, the term “post-consumer fiber” refers to a fiber that was a component part of a product previously in use by a consumer. The post-consumer fibers include fibers reclaimed from the products that have been used in residential, commercial, and industrial applications, and subsequently have been collected from the site of use or otherwise discarded.

As used herein, the term “post-industrial fiber” refers to a fiber reclaimed from a product that is a byproduct from manufacturing that has been diverted from the manufacturing waste stream.

As used herein, the term “acclimation period” refers to a period of time required for one or more components in the layered composite article to adjust or condition to equalize differing stresses that may be present in the various components. In some aspects, the lack of an “acclimation period” can refer to the lack of an acclimation period associated with assembly of the various component parts during manufacture of the layered composite article of the present disclosure. In other aspects, an acclimation period can refer to a period of time or lack thereof needed between product arrival at a site of installation and actual installation of the product.

While aspects of the present invention can be described and claimed in a particular statutory class, such as the system statutory class, this is for convenience only and one of ordinary skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

The present invention may be understood more readily by reference to the following detailed description of various aspects of the invention and the examples included therein and to the Figures and their previous and following description.

Article

In some aspects, and as generally depicted in FIG. 1, described herein is a layered composite article 100, comprising: a) a rigid backing portion 110 comprising a rigid core 120 having a first surface 122 and an opposed second surface 124, wherein the rigid core comprises at least one densified fiber batt 126 and wherein the at least one densified fiber batt is comprised of a first plurality of oriented fibers having a first melting point and a second plurality of oriented fibers having a second melting point different from the first melting point; and b) a decorative portion 130 having a first surface 132 and an opposed second surface 134, wherein the second surface of the decorative portion is affixed to the first surface of the rigid core.

In some aspects, the densified fiber batt has a density in the range of from about 5 lb/ft$^3$ to about 100 lb/ft$^3$, including exemplary densities of 10, 15, 20, 25, 30, 35, 40, 45, 50, 55, 60, 65, 70, 75, 80, 85, 90, and 95 lb/ft$^3$. In still further aspects, the volumetric density can be a value within any range derived from the above values, including for example, a density of from about 15 to about 75 lb/ft$^3$.

In certain aspects, the densified fiber batt can have a density of at least about 10 lb/ft$^3$, including exemplary values of at least about 15 lb/ft$^3$, about 20 lb/ft$^3$, about 25 lb/ft$^3$, about 30 lb/ft$^3$, about 35 lb/ft$^3$, about 40 lb/ft$^3$, about 45 lb/ft$^3$, or about 50 lb/ft$^3$. In certain aspects, the densified fiber batt can have a density in a range between any two foregoing values.

In yet other aspects, the densified fiber batt can have a density no greater than about 50 lb/ft$^3$, about 45 lb/ft$^3$, about 40 lb/ft$^3$, about 35 lb/ft$^3$, about 30 lb/ft$^3$, 25 lb/ft$^3$, about 20 lb/ft$^3$, about 15 lb/ft$^3$, or about 10 lb/ft$^3$. In certain aspects, the densified fiber batt can have a density in a range between any two foregoing values. It is understood that the densified batt can have a density as low as a density of a fiber batt comprising a substantially identical first plurality of oriented fibers and a substantially identical a second plurality of oriented fibers that has not undergone any densification processes, for example heat treating or pressure treating processes.

In yet other aspects, the rigid core of the inventive layered composite article can have multiple regions or portions of varying or differing densities. For example, the rigid core of the layered composite can comprise a first portion 126(*a*) having a first density and a second portion 126(*b*) having a second density different from the first density. In some aspects, the first portion of the rigid core is adjacent to the first surface of the rigid core. In other aspects, the second portion of the rigid core is adjacent to the second surface of the rigid core. In certain aspects, the first density is larger than the second density. In still other aspects, the first density is lower than the second density. These portions of varying densities can occur within a single fiber batt or can be provided by the presence of more than one fiber batts layered amongst each other.

In still further aspects, the rigid core can comprise at least two densified fiber batts. For example, again as illustrated in FIG. 1, first and second portions 126(*a*) and 126(*b*) can also represent the presence of two fiber batts. In aspects where two or more densified fiber batts are present, each of the densified fiber batts exhibits a density that can be the same or different from another densified batt. In some aspects, the rigid core can comprise a first densified fiber batt having a third density and a second densified fiber batt having a fourth density. In some aspects, the third density is larger than the fourth density. In yet other aspects, the third density is lower than the fourth density. In certain aspects, the first densified fiber batt is adjacent to the first surface of the rigid core, while the second densified fiber batt is adjacent to the second surface of the rigid core. In aspects where more than two densified fiber batts are present, each of the densified fiber batts can be arranged in any configuration determined by one of ordinary skill in the art and useful for a final application. In these aspects, each of the densified fiber batts can exhibit same or a different density.

In still further aspects, the inventive rigid core can exhibit a density that is lower than a density of a conventional rigid backing portion comprising a layer of polyvinyl chloride material or a wood based material as a core, and wherein such conventional rigid backing is absent of a densified fiber batt. In yet other aspects, the inventive rigid core exhibits a higher porosity than a comparable conventional rigid backing portion comprising a layer of polyvinyl chloride material or a wood material as a core, and wherein such conventional rigid backing is absent of a densified fiber batt.

In still further aspects, the layered composite can optionally comprise a densified layer comprising a non-fibrous composition. For example, the densified layer of non-fibrous composition can be a densified powder layer. The densified powder composition can comprise a polymer powder. In still further aspects, the polymer powder can comprise a polypropylene, a polyester, a polyethylene, or a combination thereof. In still further aspects, such layer can be formed by scattering the polymer powder using a powder scattering machine. The optional densified non-fibrous layer can be positioned at any desired location within the layered composite structure. For example, the densified non fibrous layer can be positioned between the top surface of the rigid core layer and the decorative portion. In this aspect, the densified non-fibrous layer can optionally serve as a substrate for printing an ink layer. This together can form a decorative portion or layer as described further herein. In still further aspects, the densified non-fibrous layer can increase the density of the rigid core to resist indentation during an extensive use.

In certain aspects, the first and second plurality of oriented fibers can have a substantially random orientation, a substantially uniform orientation, or any variation of a predetermined orientation that is between a random and uniform orientation. Still further, the plurality of fibers can itself comprise any desired combination of various orientations. In some aspects, the first plurality of oriented fibers is substantially randomly oriented. In yet other aspects, the first plurality of oriented fibers is uniformly oriented. In still further aspects, the first plurality of oriented fibers in arranged in a predetermined orientation.

In some aspects, the second plurality of oriented fibers is substantially randomly oriented. In yet other aspects, the second plurality of oriented fibers is uniformly oriented. In still further aspects, the second plurality of oriented fibers in arranged in a predetermined orientation.

In still further aspects, the first and the second plurality of oriented fibers can have the same or different orientation. In some exemplary aspects, the first plurality of oriented fibers can have a substantially random orientation, while the second plurality of oriented fiber can have a uniform orientation. In yet other exemplary aspects, the first plurality of oriented fibers can have a uniform orientation, while the second plurality of oriented fibers is substantially randomly oriented. In still further aspects, both the first and the second plurality of oriented fibers can have the same orientation.

In certain aspects, the first and second plurality of oriented fibers can comprise a staple fiber, a bulk continuous fiber (BCF), or a combination thereof. In some aspects, the first plurality of oriented fibers can comprise a staple fiber. In other aspects, the first plurality of oriented fibers can comprise a bulk continuous fiber. In yet other aspects, the first plurality of oriented fibers can comprise both staple and bulk continuous fiber.

In other aspects, the second plurality of oriented fibers can comprise a staple fiber. In other aspects, the second plurality of oriented fibers can comprise a bulk continuous fiber. In yet other aspects, the second plurality of oriented fibers can comprise both staple and bulk continuous fiber.

In still further aspects, the first plurality of oriented fibers can comprise a staple fiber, while the second plurality of oriented fibers can comprise a bulk continuous fiber. In yet other aspects, the first plurality of oriented fibers can comprise a bulk continuous fiber, while the second plurality of oriented fibers can comprise a staple fiber. In still further aspects, both first and second plurality of oriented fibers can comprise a staple fiber. In yet other aspects, both first and second plurality of oriented fibers can comprise a bulk continuous fiber.

According to certain aspects, the first and second plurality of oriented fiber can exhibit a substantially uniform size, including substantially uniform liner density measured in denier units and substantially uniform fiber lengths. However, in alternative aspects, fibers present within the first and second plurality of oriented fiber can have non-uniform linear densities and non-uniform fiber lengths. According to these aspects, the population of the first and second plurality of oriented fibers having non-uniform linear fiber densities can, for example, have individual linear fiber densities in the range of from about 1 to about 500 denier, including exemplary values of about 3 denier, about 5 denier, about 10 denier, about 15 denier, about 20 denier, about 25 denier, about 30 denier, about 35 denier, about 40 denier, about 45 denier, about 50 denier, about 60 denier, about 70 denier, about 80 denier, about 90 denier, about 100 denier, about 120 denier, about 150 denier, about 170 denier, about 200 denier, about 250 denier, about 300 denier, about 350 denier, about 400 denier, and about 450 denier. It is further understood that the population of the first and second plurality of oriented fibers can have individual linear fiber density in any range between two foregoing values. For example, in certain aspects, the individual linear fiber density can be from about 1 to about 5 denier, from about 5 denier to about 25 denier, from about 5 denier to about 200 deniers, or from about 100 denier to about 500 denier. Still further, a population of the first and second plurality of oriented fibers having non-uniform linear density can collectively provide an average linear fiber density that is, for example, greater than 5 denier, greater than 10 denier, greater than 15 denier, greater than 20 denier, greater than 25 denier, greater than 30 denier, greater than 35 denier, greater than 40 denier greater than 45 denier, greater than 50 denier, greater than 100 denier, greater than 200 denier, greater than 300 denier, or even greater than 400 denier.

In other aspects, the first and second plurality of oriented fibers, each independently can comprise polyester, polypropylene, polyethylene, polyamides, polyurethane, polylactic acid, acetal, co-polyester, co-polyimide, polystyrene, or a combination thereof.

Exemplary fibers present in the first and/or second plurality of oriented fibers can include polyamides, polyester, polypropylene, polyethylene, polyurethane, polyethylene terephthalate, polytrimethylene terephthalate, latex, styrene butadiene rubber, or any combination thereof.

In some aspects, the densified fiber can further comprise a third plurality of oriented fibers. In such aspects, the third plurality of oriented fiber has a third melting point different from the first melting point of the first plurality of fibers or the second melting point of the second plurality of fibers. In some aspects the third plurality of oriented fibers can be natural fibers. In yet other aspect, the natural fibers exhibit a decomposition point. In yet other aspects, the third plurality of oriented fibers can comprise a staple fiber, a bulk continuous fiber, or a combination thereof.

In yet other aspects, the natural fibers comprise bast fibers, cotton, cellulose, wool, silk, linen, mineral, coconut, glass, or any combination thereof.

In some aspects, the third plurality of oriented fibers can have a substantially random orientation. In yet other aspects, the third plurality of oriented fibers can have a substantially uniform orientation. In still further aspects, the third plurality of oriented fibers can have a predetermined orientation.

In still further aspects, the third plurality of oriented fiber can exhibit a substantially uniform size, including substantially uniform liner density measured in denier units and substantially uniform fiber lengths. However, in alternative aspects, fibers present within the third plurality of oriented fiber can have non-uniform linear densities and non-uniform fiber lengths. According to these aspects, a population of the third of oriented fibers having non-uniform linear fiber densities can, for example, have individual linear fiber densities in the range of from about 1 to about 500 denier, including exemplary values of about 3 denier, about 5 denier, about 10 denier, about 15 denier, about 20 denier, about 25 denier, about 30 denier, about 35 denier, about 40 denier, about 45 denier, about 50 denier, about 60 denier, about 70 denier, about 80 denier, about 90 denier, about 100 denier, about 120 denier, about 150 denier, about 170 denier, about 200 denier, about 250 denier, about 300 denier, about 350 denier, about 400 denier, and about 450 denier. It is further understood that the population of the first and second plurality of oriented fibers can have individual linear fiber density in any range between two foregoing values. For example, in certain aspects, the individual linear fiber density can be from about 1 to about 5 denier, from about 5 denier to about 25 denier, from about 5 denier to about 200 deniers, or from about 100 denier to about 500 denier. Still further, a population of the first and second plurality of oriented fibers having non-uniform linear density can collectively provide an average linear fiber density that is, for example, greater than 5 denier, greater than 10 denier, greater than 15 denier, greater than 20 denier, greater than 25 denier, greater than 30 denier, greater than 35 denier, greater than 40 denier greater than 45 denier, greater than 50 denier, greater than 100 denier, greater than 200 denier, greater than 300 denier, or even greater than 400 denier.

In yet other aspects, it is understood that the decomposition point of the fibers present in the third plurality of oriented fibers is higher than the first and/or second melting point such that heat treatment effective to result in melting and consolidation of at least one of the first and second pluralities of fibers does not result in any substantial decomposition of natural fibers present.

In still further aspects, the layered composite article can comprise a) a rigid backing portion comprising a rigid core having a first surface and an opposed second surface, wherein the rigid core comprises at least one densified fiber batt and wherein the at least one densified fiber batt is comprised of first plurality of oriented fibers comprising a natural fiber having a decomposition temperature and a second plurality of oriented fibers having a melting point lower than the decomposition temperature of the first plurality of oriented fibers; and b) a decorative portion having a first surface and an opposed second surface, wherein the second surface of the decorative portion is affixed to the first surface of the rigid core. It is understood that in these aspects, the first plurality of oriented fiber comprising natural fibers can be any natural fibers listed above. It is further understood that the second plurality of oriented fibers can comprise any foregoing fibers, or any fibers described below.

In yet other aspects, where the first plurality of fibers is not a natural fiber, the first plurality of fibers can comprise a multi-component fiber. In yet other aspects, the second pluralities of fibers can comprise a multi-component fiber. It is understood that in some aspects of the present invention, the multi-component fibers can be defined as "extruding two polymers from the same spinneret with both polymers contained within the same filament." In some aspects, multi-component fibers can have any cross sectional shape or geometry that can be contemplated by one of ordinary skill in the art. In some aspects, the multi-component fibers can have cross-section structures that include but are not limited to side-by-side fiber, sheath-core fiber, islands-in-the-sea fiber and segmented-pie cross-section types.

It is understood that in some aspects, the multicomponent fiber can comprise at least first component having the first melting point and at least second component having the second melting point different from the first melting point. It is further understood that in some aspects, the at least first component can comprise a polymeric component. In yet other aspects, the at least second component can comprise a polymeric component.

In yet other exemplary aspects, the multi-component fibers comprise a sheath-core configuration. In some aspects, the sheath comprises the first component. In yet other aspects, the core comprises a second component. In yet other aspects, the sheath can comprise a second component and the core can comprise the first component. It is understood that both sheath and core can comprise any mentioned above fibers as a component. In some aspects, the polymeric core component can have a higher melting point than the polymeric sheath component. In some aspects, the polymeric core component can comprise polyester, aliphatic polyamides, polyphenylene oxide and/or co-polymers or blends thereof. In yet other aspects, the polymeric core component can comprise polyester, polypropylene, polyethylene, polyamides, polyurethane, polylactic acid, acetal, co-polyester, co-polyimide, polystyrene, or a combination thereof. In yet other aspects, the polyester can comprise polyethylene terephthalate, polybutylene terephthalate, or polyparaphenylene terephthalamide. In yet other aspects, the polymeric core comprises polyethylene terephthalate. In further aspects, the sheath polymer can comprise a polyimide, polyethylene, or polyester. In still further aspects, the sheath polymer can comprise polyester, polypropylene, polyethylene, polyamides, polyurethane, polylactic acid, acetal, co-polyester, co-polyimide, polystyrene, or a combination thereof. In yet further aspects, the sheath polymer can comprise a nylon, or polypropylene. In still further aspects, the sheath-core multicomponent fiber comprises a polyester as a core component and nylon as a sheath component.

It is further understood that in some aspects the sheath and core of the multi-component fiber can comprise the same polymer having different melting points. In still further aspects, the sheath-core multi-component fiber comprises a polyester as a core component and polyethylene as a sheath component. In still further aspects, the sheath-core multicomponent fiber comprises a polyester having the first melting point as a core component and a polyester having the second melting point as a sheath component.

It is understood that in aspects, where the multi-component fiber is used in a combination with the natural fiber, the melting point of each component in the multi-component fiber is lower than the decomposition temperature of the natural fiber.

In some aspects, the at least one densified fiber batt described herein can comprise a first plurality of oriented fibers having a first melting point, wherein the first plurality of oriented fibers comprises a single-component fiber. In yet other aspects, the at least one densified fiber batt described herein can comprise a second plurality of oriented fibers comprising a multi-component fiber comprising at least first component having the first melting point and at least second component having a second melting point.

In yet other aspects, the at least one densified fiber batt described herein comprises a plurality of oriented multicomponent fibers, wherein each of the plurality of oriented multi-component fibers comprises at least first component having a first melting point and at least second component having a second melting point different from the first melting point. In these aspects, the plurality of oriented multicomponent fibers can comprise any multi-component fiber configurations described herein. In yet other aspects, any disclosed herein polymers can be used as any component of the plurality of oriented multi-component fibers.

In still further aspects, the rigid core is substantially free of a PVC material, or high density fiber (HDF) derived from a wood based material, or medium density fiber (MDF) derived from a wood based material. In still further aspects, the rigid core is substantially free of a wood based material.

In yet other aspects, the rigid core can further comprise a filler component. Exemplary and non-limiting fillers that can be incorporated into the rigid core layer can include calcium carbonate, fly-ash, recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In some aspects, the filler content can be virgin. In other aspects, the filler content can be reclaimed. In certain aspects, the filler content can be reclaimed from post-consumer articles. In yet other aspects, the filler content can be reclaimed from post-industrial articles.

In certain aspects, the filler comprises one or more of calcium carbonate, aluminum trihydrate, barite, feldspar, cullet, fly ash, kaolin clay, limestone, polyurethane foam, rubber, thermoplastic powder, thermoplastic polyurethane (TPU), wollastonite, or any combination thereof.

In yet other aspects, the rigid core can further comprise a pigment, a flame retardant, surfactant, processing aids, or a combination thereof. In certain aspects, the rigid core can comprise one or more flame retardant components. Exemplary flame retardants that can be incorporated into the rigid core include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resorcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the rigid core and the selection of such amount will depend on a required application. Such amounts can be readily determined through no more than routine experimentation.

In other aspects, any pigments or surfactant known in the art can be utilized. In yet other aspects, any processing aids known in the art can be used. In some aspects, processing aids can include without limitation antistatic chemicals, lubricants, oils, or any combination thereof.

In yet other aspects, at least one of the first or second pluralities of fibers, or even of the third pluralities of fibers, when present, can comprise reclaimed fibers. In some aspects, the reclaimed fibers can comprise a post-consumer fiber. In still further aspects, the reclaimed fibers can comprise a post-industrial fiber. In still further aspects, the reclaimed fibers can comprise both a post-consumer and post-industrial fiber. It is understood that the both post-consumer and post-industrial fibers can comprise any fibers described above. It is understood that in some aspects, the reclaimed fiber is reclaimed from a carpet or carpet tile. In yet other aspects, the reclaimed fiber can be fiber reclaimed from any material, for example any material comprising polymeric and/or natural fibers.

The reclaimed fibers can be present in the final rigid core in any desired amount, including for example an amount in the range of from greater than 0% to 100% by weight, including exemplary amounts of 5%, 10%, 15%, 20%, 25%, 30%, 35%, 40%, 45%, 50%, 55%, 60%, 65%, 70%, 75%, 80%, 85%, 90%, and 95%. In still further aspects, the reclaimed fibers can be present in an amount within any range derived from the above values, including for example, an amount in the range of from greater than 0 weight percent to 90 weight percent, from 30 weight percent to 70 weight percent, or from 40 weight percent to 60 weight percent. In still other aspects, the layered composite article can comprise at least about 10%, at least about 20%, at least about 30%, at least about 40%, or at least about 50% by weight of reclaimed material, such as post-consumer material, post-industrial material, post-commercial material, or a combination thereof. In another aspect, the layered composite article comprises from about 50% to about 100% by weight of reclaimed material. It is further understood that the reclaimed material in the layered composite article can be present as reclaimed fibers, reclaimed fillers, or a combination thereof.

It is understood that by incorporating reclaimed material into the inventive layered composite articles several advantages can be realized. For example, second generation products incorporating the reclaimed material have less of an environmental footprint relative to traditional composites, comprising only virgin materials. In a further aspect, the use of reclaimed material reduces the amount of traditional, often environmentally harmful materials that previously were sent to landfill, while still providing the same or similar level of composite performance. Still further, substitution of virgin material with reclaimed material can reduce the manufacturing costs associated with producing various composite products, such as floor covering products. Additionally, the incorporation of reclaimed material into a second generation composite can also provide mechanical reinforcement or stability to the second generation composite, if desired.

In certain aspects, it is understood that the first plurality of oriented fibers, the second plurality of oriented fibers, and the third plurality of oriented fibers described herein can be present in any amount to provide the rigid core having a desired density. It is understood that the first, second and third pluralities of oriented fibers can be present in any ratio to provide the rigid core having a desired density.

In some aspects, the plurality of oriented fibers having a lowest melting point can be present in the final rigid core (or in the densified fiber batt) in any desired amount, including for example an amount in the range of from greater than 0% up to 100% by weight, including exemplary amounts of 5%, 10%, 15%, 20%, 25%, 30%, 35%, 40%, 45%, 50%, 55%, 60%, 65%, 70%, 75%, 80%, 85%, 90%, 95%, and 100%. In still further aspects, the plurality of oriented fibers having a lowest melting can be present in an amount within any range derived from the above values, including for example, an amount in the range from about 0% to about 80% by weight of the total amount of fibers present in the densified fiber batt, alternatively from about 5% to about 60% by weight of the total amount of fibers present in the densified fiber batt, alternatively from about 30% to about 50% by weight of the total amount of fibers present in the densified fiber batt or still alternatively from about 40% to about 60% by weight of the total amount of fibers present in the densified fiber batt. In the aspects, wherein the at least one plurality of oriented fibers comprises a multi-component fiber, the ratio between various components having different melting points in the multi-component fiber can be any ratio chosen by one of ordinary skill in the art. In some aspects, wherein two components are presents, the ratio by the weight between two components having different melting points can be from about 0.1, about 0.2, about 0.3, about 0.4, about 0.5, about 0.6, about 0.7, about 0.8, about 0.9, or 1.

In aspects wherein the at least first plurality of oriented fibers comprises a multi-component fiber, at least a first component of the multi component fiber can have a first melting point and at least a second component of the multi component fiber can have a second melting point different from the first component melting point. Further, the second plurality of oriented fibers can comprise a plurality of single-component fibers, wherein the single-component fiber can also have approximately the same melting point as the first melting point of the first multi-component component. Still further, the ratio between the first plurality of fibers and the second plurality of fibers can be any desired value intended to result in a fiber batt having a predetermined desired density. In some exemplary aspects, the multi-component fiber can be present in an amount from greater than 0 to 100% by weight, including exemplary values of about 1%, about 5%, about 10%, about 20%, about 30%, about 40%, about 50%, about 60%, about 70%, about 80%, about 90%, about 95%, about 99%, and about 99.9%. In some aspects, the multi-component fiber can be present in 100% by weight.

In certain aspects, the rigid core can have a thickness in the range from about 0.5 mm to about 12 mm, including exemplary values of about 1 mm, about 2 mm, about 3 mm, about 4 mm, about 5 mm, about 6 mm, about 7 mm, about 8 mm, about 9 mm, about 10 mm, and about 11 mm. In still further aspects, the rigid core can have a thickness in any range between two foregoing values. In some aspects, the thickness can be in the range from about 0.5 mm to about 12 mm, from about 2 mm to about 12 mm, or from about 5 mm to about 12 mm.

In some aspects, the inventive rigid core can be permeable to moisture. In yet other aspects, the inventive rigid core is impermeable to moisture. In still further aspects, the inventive rigid core does not accumulate or hold moisture within the densified fiber batt. It is further understood that in some aspects the presence of moisture does not alter the rigid core. In certain aspects, moisture does not alter mechanical properties of the rigid core. In yet other aspects, the rigid core exhibits a moisture vapor transmission rate of greater than about 3 pounds per 1,000 $ft^2$ per 24 hours, greater than about 3.5 pounds per 1,000 $ft^2$ per 24 hours, greater than about 4 pounds per 1,000 $ft^2$ per 24 hours, greater than about 4.5 pounds per 1,000 $ft^2$ per 24 hours, or greater than about 5 pounds per 1,000 $ft^2$ per 24 hours.

As summarized above and as again illustrated in FIG. 1, the layered composite article comprises a decorative portion 130 having a first surface 132 and an opposed second surface 134, wherein the second surface of the decorative portion is affixed to the first surface of the rigid core. In certain aspects, the decorative portion of the inventive article comprises a decorative substrate layer or a decorative surface layer 136. As used herein, it should be understood that the term decorative substrate layer and decorative surface layer can be used interchangeably. In some aspects, the decorative surface layer comprises polyvinyl chloride (PVC), whitened PVC, opaque PVC, oriented polypropylene (OPP), polyolefin (PO), woven polyethylene (PE), non-woven PE, woven polypropylene (PP), nonwoven PP, woven PET, whitened fiber PET, nonwoven PET, woven nylon, nonwoven nylon, conventional paper, conventional foil, or foiled oriented polypropylene. In still further aspects, the decorative surface layer can comprise one or more of a heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPS), polycarbonate, polyethylene (PE), or a copolymer thereof.

In certain aspects, the decorative surface or substrate layer has a thickness from about 0.5 mil to about 20 mil, including exemplary values of about 2 mil, about 3 mil, about 4 mil, about 5 mil, about 6 mil, about 7 mil, about 8 mil, about 9 mil, about 10 mil, about 11 mil, about 12 mil, about 13 mil, about 14 mil, about 15 mil, about 16 mil, about 17 mil, about 18, mil, and about 19 mil. In still further aspects, the decorative surface or substrate layer can have any thickness in a range derived from any two of the above listed exemplary values. For example, the substrate layer can comprise a thickness in a range of from about 0.5 mil to about 5 mil, or from about 3 mil to about 7 mil, or from about 7 mil to about 20 mil. In still further aspects, the substrate layer can be a film.

In yet other aspects, the decorative portion comprises an image layer 138. In certain aspects, the image layer is printed or otherwise transferred on a surface of the decorative substrate layer or the decorative surface layer. In yet other aspects, the image layer is printed or otherwise transferred on a surface of any visible layer. In some aspects, the substrate layer and the visible layer are the same. In other aspects, the substrate layer and the visible layer are different.

In some aspects, the decorative layer is affixed to the first surface of the rigid core with an adhesive. It is understood that the adhesive can be any adhesive known in the art. In some aspects, the adhesive comprises at least one of acrylic adhesive, ethylene-vinyl acetate (EVA), ethylene-acrylic acid (EAA), ethylene-acrylic acid-maleic anhydride (EAA-MAH), ethylene-methyl acrylate-maleic anhydride (EMA-MAH), ethylene-vinyl acetate-maleic anhydride (EVA-MAH), low density-polyethylene-maleic anhydride (LDPE-MAH), high density polyethylene-maleic anhydride (HDPE-MAH), polyurethane (PUR), polyurethane dispersions (PUD), a polyester hotmelt, a UV-curable adhesive, or a combination thereof. In some aspects, the polyurethane dispersions can comprise isocyanate terminated urethane polymer, methylenebis(phenylisocyanate), methylene bisphenyl isocyanate, and the like. The polyurethane dispersion can further comprise oxazolidine hardeners and various modifiers.

In some aspects, the UV-curable adhesives can comprise polyurethane acrylate-based main-chain polymers, polyisoprene acrylate-based main chain polymers, polybutadiene acrylate-based main-chain polymers, monomeric (meth) acrylates, and the like. In certain aspects, the UV-curable adhesives can comprise any adhesives known in the art that are capable of being cured upon exposure to a UV light. In other aspects, the UV-curable adhesive can further comprise other additives such as, for example, and without limitation photo-polymerization initiators, additives that increase flexibility of the resin, and the like.

In still further aspects, the adhesive comprises ethylene-vinyl acetate (EVA). In yet other aspects, the adhesive comprises ethylene-acrylic acid (EAA). In still further aspects, the adhesive comprises polyurethane dispersions (PUD), polyurethane reactive (PUR) hot melt adhesive, or a polyester. In still further aspects, the polyester can comprise polyethylene terephthalate (PET), a polylactide (PLA), polyethylene terephthalate glycol-modified ester, polytrimethylene terephthalate, or any combination thereof.

The adhesive can comprise substantially linear ethylene polymers and homogeneously branched linear ethylene polymers (i.e., homogeneously branched ethylene polymers). Homogeneously branched ethylene polymers (including substantially linear ethylene polymers in particular) have low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra-low density polyethylene (ULDPE).

In certain aspects, the adhesive has a thickness of about 0.1 mil to about 5 mil, including exemplary values of about 0.5 mil, about 1 mil, about 1.5 mil, about 2 mil, about 2.5 mil, about 3 mil, about 3.5 mil, about 4 mil, and about 4.5 mil. In still further aspects, the adhesive can have any thickness in a range derived from any two of the above listed exemplary values. For example, the adhesive can comprise a thickness in a range of from about 0.5 mil to about 4 mil, or from about 0.1 mil to about 3 mil.

In yet other aspects, the decorative portion can be affixed to the first surface of the rigid core by any other known in the art methods. In some exemplary aspects, the decorative portion can be affixed to the first surface of the rigid core by needling. For example, the decorative portion comprising a plurality of whitened PET fibers as a substrate can be affixed to the first surface of the rigid core by needling. In other aspects, decorative portion affixed by needling can be further heat pressed to the first surface of the rigid core. In these aspects, the image layer can be formed by a direct printing on the substrate, after the decorative portion is affixed to the first surface of the rigid core. In such aspects, the randomly oriented fibers with a base shade of white or near white can be affixed to the first surface of the rigid core. The fibers used to form this substrate can comprise at least about 10%, at least about 20%, at least about 30%, at least about 40%, at least about 50%, at least about 60%, at least about 70%, at least about 80%, at least about 90%, or at least about 95% by weight of a low melt fiber which can create a bond to the rigid core when heated to a temperature from about 110 to about 250° C., including exemplary values of about 120° C., about 130° C., about 140° C., about 150° C., about 160° C., about 170° C., about 180° C., about 190° C., about 200° C., about 210° C., about 220° C., about 230° C., and about 240° C. In yet other aspects, the resulting surface can be further flattened to maintain a level of smoothness allowing the transferred image to have a sufficient detail by a belt or use of a release film or paper.

In yet other aspects, the decorative portion can be affixed to the first surface of the rigid core by first scattering a polymer powder. In such aspects, the scattered powder comprises a polymer comprising a polypropylene, a polyester, a polyethylene, or a combination thereof. In yet other aspects, the decorative portion disposed on the scattered powder is further heat pressed to the first surface of the rigid core.

In some aspects, the image layer can comprise any conventional ink, dye, pigment, or other marking substance that can be applied in a desired pattern. For example and without limitation, the image layer can comprise water-based, soy-based, a UV-cured inks, and/or solvent-based pigments. In still further aspect, the image layer is a UV cured ink.

It is understood that UV-cured inks can comprise photo-initiators, pigments, additives, monomers and oligomers of various polymers, and the like. In some exemplary aspects, the UV-cured inks can comprise, without limitation, (5-ethyl-1,3-dioxan-5yl)methyl acrylate, 2-phenoxyethyl acrylate; 1-vinylhexahydro-2H-azepin-2-one, substituted phosphine oxide, trimethylolpropane triacrylate, phenyl bis (2,4 6-trimethylbenzoyl)phosphine oxide, epoxy acrylate oligomer, diacrylate monomer, multi-functional monomers, amine modified acrylate oligomer, 1-vinylhexahydro-2H-asepin-2-one, diacrylate oligomers, benzophenone, triacrylate monomers, 1-hydroxy-cyclohexylphenyl-ketone, 2 hydroxy-2-methylpropiophenone, and the like.

It is further understood that the image layer can be applied to the decorative substrate layer or decorative surface layer or any other visible layer by any conventional printing means, which can include, without limitation, directly printing, rotogravure printing, digital printing, silk screen printing, flexography printing, lithography printing, offset-lithography printing, relief printing, thermography printing, thermal sublimation printing, dye-sublimation printing, heat-transfer printing, digital printing, and the like. In yet other aspects, the image layer can be applied by reverse printing. In such exemplary aspects, the image is printed on an underside of the clear film rather than top side of the film. According to this aspect, layers 136 and 138 in FIG. 1 would be reversed.

In still further aspects, the image layer can be applied by a digital printing. In some aspects, the image layer is applied prior to affixing the decorative portion to the rigid core. In other aspects, the image layer is applied after the decorative portion is affixed to the rigid core. In an exemplary aspect, the image layer can comprise inks and pigments manufactured by INX Inks, Durst, HP, EFI, Sun Chemical, DyStar, Sensient Inks Technologies, Kao Collins, Mankiewicz, Marabu, Borbeaux or Tiger. In yet other aspects, the image layer can be digitally printed utilizing digital printers manufactured by Cefla, Durst, Hymmen, EFI, Barbaran, Zimmer Austria, HP, Fujifilm, Mimaki, AGFA, Kodak, Canon, Epson, KBA, OKI, Ricoh, Heidelberg, Mutoh or Inca.

In certain aspects, the formed image layer can be a continuous layer that covers substantially all of the top surface of the substrate. In yet other aspects, the formed image layer can be a discontinuous layer that covers only a portion of the top surface of the substrate. In yet other aspects, the image layer can have any desired aesthetic appearance. In some exemplary aspects, the image layer can have an appearance of simulated hardwood, concrete, slate, or ceramic flooring.

In some aspects, the decorative layer portion can have any suitable weight and thickness. In some embodiments, the decorative layer portion has a weight of from about 0.2 ounces per square yard to about 1.0 ounce per square yard, including, without limitation, decorative layer portions having a weight of about 0.3, 0.4, 0.5, 0.6, 0.7, 0.8, and 0.9 ounces per square yard. In a further aspect, a decorative layer portion can have a total thickness of from about 1 mil to about 20 mil, including exemplary values of about 2 mil, about 3 mil, about 4 mil, about 5 mil, about 6 mil, about 7 mil, about 8 mil, about 9 mil, about 10 mil, about 11 mil, about 12 mil, about 13 mil, about 14 mil, about 15 mil, about 16 mil, about 17 mil, about 18 mil, and about 19 mil; although virtually any thickness can be used.

In yet other aspects, the decorative layer can further comprise an aesthetic layer such as a thin veneer of slate, ceramic, stone, wood, cork, a film, woven, or nonwoven material.

In yet another aspect, the decorative layer can further comprise a layer made of a scatter coated powder. In some aspects, the scattered powder can comprise a polypropylene, a polyester, a polyethylene, or a combination thereof.

In yet other aspects, the decorative layer can comprise woven fibers, stone, ceramics, glass, needlepunched materials, leather, animal hides, veneer, or any combination thereof.

In an additional aspect, any of aesthetic layers described above can be adhered to any foregoing substrate.

In yet other aspects, the decorative portion further comprises an optional wear layer 140 adhered to the top surface 132 of the decorative layer. In yet other aspects, the wear layer is not present. In the aspects where the wear layer is present, the wear layer can comprise, for example and without limitation, conventional ionomers, polyethylene terephthalate (PET), polyurethane, polyurethane reactive hotmelt adhesive (PUR)polypropylene, polytrimethylene terephthalate (PTT), polyimide, polyvinyl chloride (PVC), and the like. In a further aspect, the wear layer can comprise surlyn resin, such as, for example and without limitation, Surlyn® 1706 resin, manufactured by E.I. du Pont de Nemours and Company, Inc, or Incor PUR supplied by Kleiberit or Henkel.

In a still further aspect, the wear layer can comprise heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), high density polyethylene (HDPE), low density polyethylene (LDPE), or a copolymer thereof.

In some aspects, the wear layer is substantially transparent. In other aspects, the wear layer is substantially opaque.

In a yet further aspect, the wear layer can have a thickness in the range of greater than 0 mil to about 30 mil, including exemplary thickness ranges of from about 0.5 mil, about 1 mil, about 1.5 mil, about 2 mil, about 2.5 mil, about 3 mil, about 3.5 mil, about 4, about 5 mil, about 6 mil, about 7 mil, about 8 mil, about 9, about 10 mil, about 12 mil, about 15 mil, about 17 mil, about 20 mil, about 22 mil, about 25 mil, and about 27 mil. In a still further aspect, the thickness of the wear layer can be in a range derived from any of the above listed exemplary values. For example, the thickness can in the range up to 4 mil, or in the range from about 4 mil to about 9 mil, or from 4 mil to about 16 mil.

In some aspects, the wear layer is laminated to the decorative portion. In still other aspects, the wear layer is UV cured to the decorative portion. In some aspects, where the wear layer is not present, a spray material can be applied to the top surface of the decorative portion. In such aspects, the sprayed material can serve as a scratch coat.

In certain aspects, the decorative portion has a top layer. In yet other aspects, a top surface of the decorative portion is embossed or embossed in register. In the aspects where the wear layer is present, the top layer of the decorative portion is the wear layer. In aspects where the wear layer is absent but the decorative portion comprises a substrate layer, the substrate surface can also be the top layer of the decorative portion. In aspects where any additional aesthetic layers are present and the wear layer is absent, a top surface of the additional aesthetic layer is also the top surface of the decorative portion. In still further aspects, a scratch layer 142 can be present. The scratch layer can be applied on the top surface of the wear layer 140. Alternatively, in aspects where the optional wear layer is not present, the scratch layer can be directly applied to the top surface of the decorative layer. It is understood that the scratch layer can be applied by any known in the art methods. In some aspects, the scratch layer can comprise any materials suitable for this purpose. In still further aspects, the scratch layer can comprise transparent polyurethane based materials or transparent acrylic based materials. In still further aspects, the scratch layer can be UV cured.

When desired, embossing can be done to provide visuals and textures intended to duplicate or imitate the appearance of wood grain, slate and other visual features. Laser etching can also be utilized in lieu of embossing to achieve the desired aesthetics. Some other potential methods for texturing the surface of flooring materials, wall boards, ceilings, or roofing products include drag wiring while the temperature of an extruded product is still above glass transition temperature or dragging probes across the surface while the product or probe is moving. Further, a texture can be embedded in the surface of an injection mold, compression mold or vacuum form mold, as well. A texture can also be hot or cold stamped with pressure for creating the desired look. It is understood that embossing can be done by any techniques known in the art. In some aspects, embossing roller, film, or UV "freeze" embossing can be used. In still further aspects, the embossing can be done by using heat or inert UV cure under film or band. In some exemplary aspects, the embossing can be done by applying a viscous liquid that can be cured and crosslinked. In some further aspects, a film with a texture can be applied to the viscous liquid that is then cured through the film to form a textured surface mirroring the texture that was present on the textured film. In yet other aspects, the uncured UV polymer can be pressed with a belt or film having a negative embossing structure and then is cured via UV energy to causing the UV lacquer materials to harden in the shape of the embossing or structure film, band or paper.

In certain aspects, the embossing can be pressed in or cured in the scratch or wear layer. In other aspects, the image layer comprising embossing can be pressed into or cured into the scratch or the wear layer by various means, for example and without limitation, by a UV-cure molding method.

In still further aspects, the entire decorative portion, for example, a composite portion comprising an image layer, a wear layer, and scratch layer, can be made pre-manufactured and then applied to the rigid core using any method known in the art. In some exemplary aspects, such attachment can be done with any known adhesive material.

The layered composite article can generally have any desired shape. In one aspect, the layered composite article is substantially planar. Planar composite articles can be useful for floor coverings, or decking material, wall boards, and the like. The planar composite articles can be manufactured into any desired size, which will generally depend on the targeted application. In one aspect, the planar composite article can have a length dimension greater than a width dimension. For example, the planar composite article can be sized as a sheet, for example, a 5'×12' sheet. Such a sheet can be cut into smaller sizes as needed. In other aspects, the composite articles can be sized into a 4'×8' composite, or a 4'×10' composite, or a 5'×12' among other elongate sizes. In other aspects, the composite articles can be further sized to fit an end product. Elongate composite articles can be useful, for example, as decking materials. The composite articles can also have any desired thickness. In one aspect, the composite has a thickness of from about 0.25 to about 3 inches, or 0.5 inches to 1.0 inches, or from about 0.25 to about 0.75 inches, or from about 0.6 to about 0.75 inches. In a further aspect, the composite articles can have a suitable shape and dimension commonly used in floor tile, wall tile, ceiling tile, including but not limited to dimensions such as 1'×1', 2'×2', 3'×3, 3'×5', and the like. In some aspects, the flooring article can be configured as a panel, a plank, a sheet, a board, or a tile. In other aspects, the layered composite article is a wall board article. In yet other aspect, the layered composite is a ceiling article. Other shapes include diamond, rectangles, triangles, rounds and other shapes.

In some aspects the layered composite article comprises a first pair of apposed side edges and a second pair of opposed side edges. In certain aspects, the plurality of side edges are not profiled to define any form of an interlocking or other fastening mechanisms by which adjacent articles can be attached to one another. In still further aspects, the plurality of side edges can be profiled to form an interlocking mechanism.

As used herein, the terms “interlocking mechanism” or “interlocking structure” refer to a mechanism that allows an arrangement of various parts of the floor covering board to be connected such that the operation of one part automatically brings about or prevents the operation of another part. The interlocking mechanisms contain locking means which lock adjacent floor covering boards in at least a horizontal manner, or at least in a vertical manner, or it can include aspects that lock in both a horizontal and vertical direction. Some exemplary interlocking mechanisms contain both a tongue type protrusion and a groove like profile within the same flooring covering board. For example, the tongue profile can be machined into one side and one end of the board with the groove being machined into the opposite side and end of the same panel. Such joints can be made by machining the edges of the boards. Alternatively, parts of the interlocking mechanism can be made of a separate material which is then integrated with the floor covering board. It is understood that the term “interlocking mechanism” is not construed to be limited to the tongue and groove profiles only of the floor covering boards. Other exemplary interlocking mechanisms include snapping connections incorporated into the board edges, angling board with interlocking edges, boards with overlapping edges, boards with the puzzle-lock edges, boards with slopping edges etc. It is understood that the term “interlocking mechanism” allows a plurality of panels to be readily joined in interlocking relationship such that when assembled, there is no necessity for separate structural frames. In other aspects, interlocking mechanism can comprise a fastener. In still further aspects, the articles are free floating or mechanically fastened.

In addition to, or as an alternative to, the integrated the interlocking mechanisms described herein, the disclosed layered composite can further include or be installed using additional locking elements. In some examples, such locking elements can include strips with salient features that engage the locking element onto two adjacent articles. Such locking devices can be made of the same material as a layered composite article, aluminum, wood fiber, etc.

In further aspects, the inventive layered composite article can be directly glued to a subsurface. In still further aspects, the layered composite article can be loosely laid on a subsurface. In yet other aspects, the layered composite article can be adhered to the surface with a lock dots, adhesive strips, and the like. In such aspects, glues that can be utilized include but are not limited to Dupont VHB Gorilla glue, liquid nails, or any other commercially available glue. In still further aspects, the layered composite article can be magnetically attached to a subsurface. In some exemplary aspects, the subsurface can, for example, be coated with any substance that has magnetic properties or that contains material otherwise attracted to a magnetic material. For example, the subfloor can be coated with iron oxide or iron. In such aspects, the layered composite article can further comprises any substance exhibiting magnetic properties and be connected to the subfloor with the magnetic field present once the flooring is installed.

In still further aspects, the inventive layered composite article can be attached to an additional backing material. It is understood that the attachment of the inventive layered composite article to the additional backing material can be done by any methods known in the art. For example, and without limitation, the attachment can be done by applying an adhesive material or freely laying the layered composite article on the additional backing. It is understood that such adhesives can comprise any known in the art adhesive, for example and without limitation PUR hotmelt adhesives. In yet other exemplary aspects, the additional backing material can be a backing film, a foam, a glue or adhesive layer, or other cushioned or padded backings such as cork. In certain aspects, the additional backing can comprise a non-slip backing, a cushion, an embossed backing, a foam, a carpet underlay, or any combination thereof.

It is understood that the non-slip backing, cushion, embossed backing, foam or the carpet underlay can be comprised of any backing materials known in the art. In some aspects, they can comprise polyurethane foams. In other aspects the can comprise plastomeric polyethylene based foams or backings, such as HBEP or SLEP based foams. The description of the exemplary backings can be found, for example, in the U.S. patent application Ser. No. 11/915,553, U.S. patent application Ser. No. 12/786,036, U.S. patent application Ser. No. 12/619,059, or the U.S. Pat. No. 9,410,026, which are incorporated herein by reference in their entity.

In certain aspects, the layered composite article described herein can exhibit a radiant flux test ratings of Class I according to the ASTM E-648 standard.

In yet other aspects, the layered composite article exhibits a residential indentation of less than 0.0005 inches, when measured according to ASTM F1914-07(2011). In yet other aspects, the layered composite article exhibits a residual indentation of less than 8% of total thickness, when measured according to ASTM F1914-07(2011). In yet other aspects, the layered composite article exhibits a commercial indentation of less than 0.005 inches, when measured according to ASTM F970. In still other aspects, the layered composite article exhibits a static load indentation of less than 0.005 inches, when measured according to ASTM F970.

In yet other aspects, the layered composite article passes a Mandrel bend radius test measured according to ASTM F137(2013). In certain aspects, the test is considered as passed if no cracks or breaks are observed when the sample of the inventive article is bend around 1" mandrel. In yet other aspects, the layered composite article passes a Mandrel bend radius test of less than 1 inch measured according to ASTM F137(2013).

It is understood that stiffness of the product can be determined by measuring a flexural modulus and a flexural strength of the article.

Figure 2:
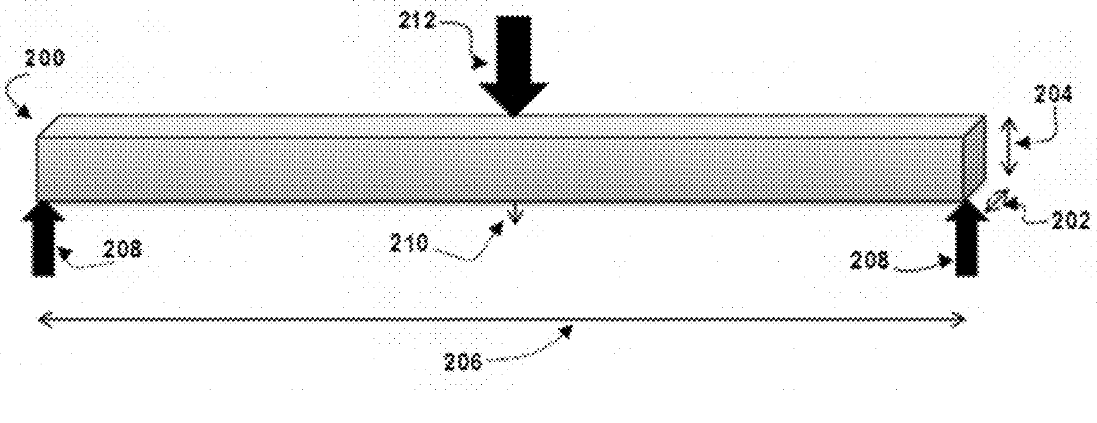
FIG. 2 shows a schematic illustration of a 3-point bending flexural test that can be used to evaluate the exemplary layered composite articles disclosed herein.

In some aspects, the flexural modulus and the flexural strength can be measured by the three-point bending flexural test. In some aspects, the flexural modulus (also known as a bending modulus) is calculated as the ratio of stress to strain in flexural deformation, or the tendency for a material to bend. In certain aspects, this value is measured in units of force per area and can be determined from the slope of a stress-strain curve produced by a flexural test, for example, when tested according to ASTM D790 standard. The schematic of the conditions used in a 3-point test is shown in FIG. 2. Rectangular beam (200) behaving as an isotropic linear material, having a width w (202) and a height h (204) is used for a test. The values used in the test in addition to the width w (202) and height h (204) of the beam, are a distance L (206) that is measured between the two outer supports (208), a second moment of area of the beam's cross-section I (not shown), and a deflection d (210) that exists due to the load F (212) applied at the middle of the beam. Calculations of the flexural modulus can be done according to the formula (1)

$$E_f = \frac{L^3 F}{4wh^3 d} \quad (1)$$

From the elastic beam theory, d can be found according to the formula (2)

$$d = \frac{L^3 F}{48IE}, \quad (2)$$

wherein again, I is area moment of inertia of cross section, and E is a modulus of elasticity. For a rectangular beam I can be found according to the formula (3)

$$I = \frac{1}{12} wh^3. \quad (3)$$

Thus, $E_f$=E, i.e, $E_f$ equals to Young's modulus or elastic modulus.

Without being bound by a theory, ideally, flexural or bending modulus of elasticity is equivalent to the tensile modulus (Young's modulus) or comprehensive modulus of elasticity. However, as one of ordinary skill in the art would readily appreciate, polymers are a part of unpredictable art, and thus, the values of flexural modulus can greatly vary.

Building codes determine the maximum deflection, usually as a fraction of the span e.g. 1/400 or 1/600. Thus, the allowable stress (or the strength limit state) or the serviceability limit state (various deflection considerations) can affect the minimum dimensions of the member required for the test.

In some aspects, the layered composite article exhibits a flexural modulus from about 0.1 to about 15.0 GPa, including exemplary values of about 0.5 GPa, about 1 GPa, about 1.5 GPa, about 2 GPa, about 2.5 GPa, about 3 GPa, about 3.5 GPa, about 4 GPa, about 4.5 GPa, about 5 GPa, about 5.5 GPa, about 6 GPa, about 6.5 GPa, about 7 GPa, about 7.5 GPa, about 8 GPa, about 8.5 GPa, about 9 GPa, about 9.5 GPa, about 10 GPa, about 10.5 GPa, about 11 GPa, about 11.5 GPa, about 12 GPa, about 12.5 GPa, about 13 GPa, about 13.5 GPa, about 14 GPa, and about 14.5 GPa.

In yet other aspects, the layered composite article exhibits a flexural strength from about 20 to about 400 MPa, including exemplary values of about 30 MPa, about 50 MPa, about 70 MPa, about 100 MPa, about 130 MPa, about 150 MPa, about 170 MPa, about 200 MPa, about 230 MPa, about 250 MPa, about 270 MPa, about 300 MPa, about 330 MPa, about 350 MPa, and about 370 MPa.

In still further aspects, the layered composite article exhibits substantially equalized component stress. In certain aspects of the current invention, the layered composite article exhibits substantially uniform stability across the article and thus does not require acclimation periods in order to allow stresses to equalize prior to any installation. In still other aspects, the dimensional stability and lack of need for an acclimation period can be measured according to the ISO 23999 Heat Curl Dimensional Stability standards. In certain aspects, the dimensional stability can be measured by analyzing the article's dimensional variations when the article is heated to a temperature of about 80° C./180° F. and then cooled back to ambient temperature. The maximum variation shown in such aspects, can be no more than about 0.05%, no more than about 0.1%, no more than about 0.11%, no more than about 0.12%, no more than about 0.13%, no more than about 0.14%, no more than about 0.15%, no more than about 0.16%, no more than about 0.17%, no more than about 0.18%, no more than about 0.19%, no more than about 0.20%, no more than about 0.25%, no more than about 0.30%, no more than about 0.35%, no more than about 0.40%, or no more than about 0.5%. In still other aspects, the maximum variation observed can be any range of values derived by any two foregoing values. In some aspects, the maximum variation is from about 0.1% to about 0.2%, or about 0.15% to about 0.5%. In still other aspects, the maximum variation is no greater than about 0.17%, when the article is heated to 80° C./180° F. and then cooled to the ambient temperature. In yet other aspects, the dimensional stability can be measured according ASTM F2199 and exhibits shrinkage of less than 0.020"/ft, less than 0.015"/ft, less than 0.010"/ft, or less than 0.005"/ft. In yet other aspects, the dimensional stability can be measured according ASTM F2199 and exhibits shrinkage of maximum of about 0.200%, maximum of about 0.167%, maximum of about 0.170%, maximum of about 0.160%, maximum of about 0.155%, maximum of about 0.150, or maximum of about 0.145%.

Figure 3A:
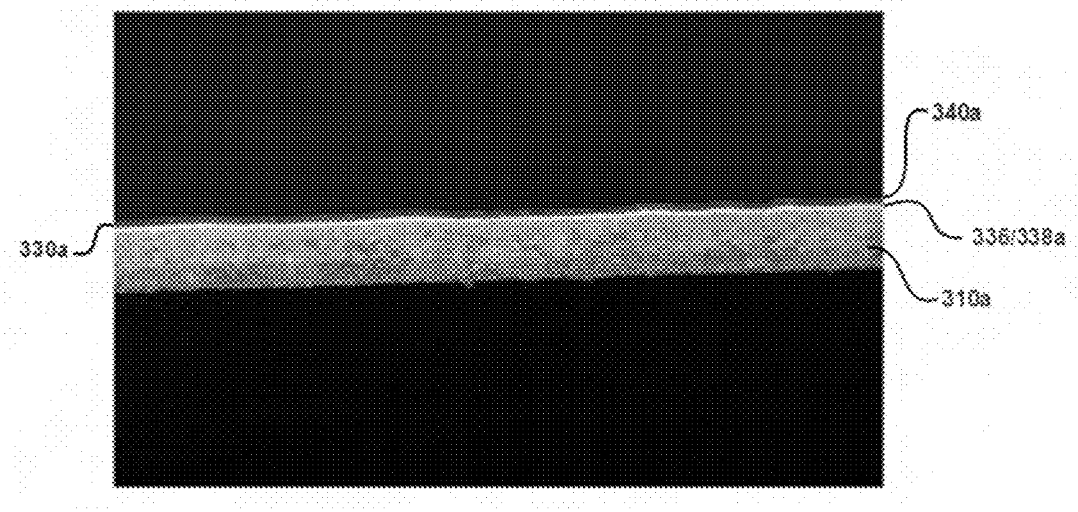
FIG. 3(*a*) shows a cross-section image of an exemplary conventional flooring covering comprising a PVC core and FIG. 3(*b*) shows a cross-section image of an exemplary flooring covering an inventive rigid core of the present disclosure.
Figure 3B:
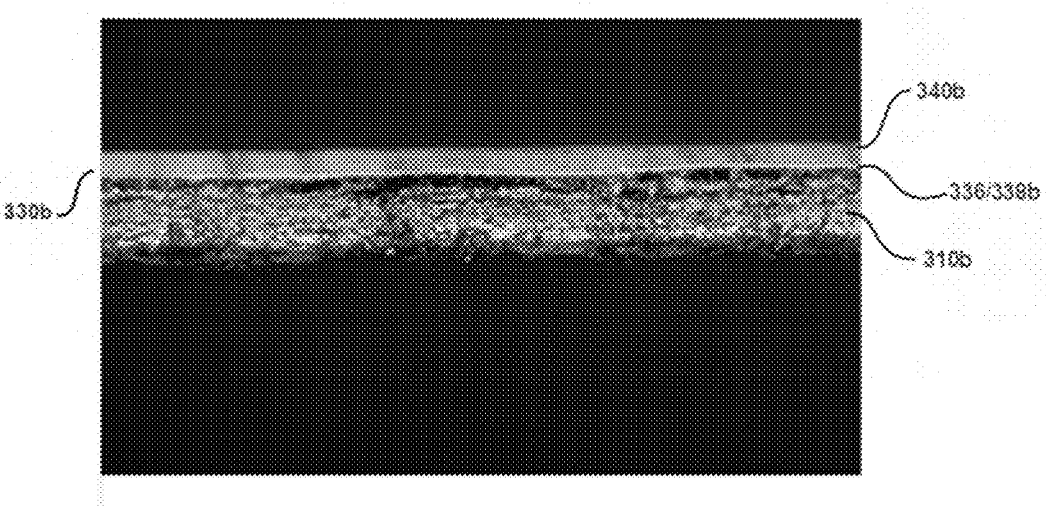

FIG. 3(*a*) shows a cross-sectional image of an exemplary layered composite article comprising a layer of polyvinyl chloride material as a rigid backing portion. This is shown in comparison to FIG. 3(*b*) which illustrates an exemplary layered composite comprising an inventive rigid core densified fiber batt. Specifically, FIG. 3(*a*) shows a cross-sectional image of a conventional rigid core article having a PVC core or backing portion layer (310*a*) and a decorative portion 330*a* affixed thereto. The decorative portion 330*a* is comprised of a printed image layer (336/338*a*). The printed image layer is itself comprised of a substrate 336 having a printed image layer 338 printed thereon, and a wear layer (340*a*). FIG. 3(*b*) shows a cross-sectional image of an exemplary inventive layered composite comprising an inventive rigid core backing portion (310*b*) comprising an inventive fiber batt and a decorative portion 330*b* affixed thereto. The decorative portion 330*b* is comprised of a printed image layer (336/338*a*). The printed image layer is itself comprised of a substrate 336 having a printed image layer 338 printed thereon, and a wear layer (340*b*).

Method

The present disclosure also provides methods for making each of the layered composite articles described above. In one aspect, a method is provided that generally comprises the steps of: a) forming a rigid backing portion comprising a rigid core having a first surface and an opposed second surface, wherein the rigid core comprises at least one densified fiber batt and wherein the at least one densified fiber batt is comprised of a first plurality of oriented fibers having a first melting point and a second plurality of oriented fibers having a second melting point different from the first melting point; b) forming a decorative portion having a first surface and an opposed second surface; and c) affixing the second surface of the decorative portion to the first surface of the rigid core.

In another aspect, disclosed herein is a method comprising: a) forming a rigid backing portion comprising a rigid core having a first surface and an opposed second surface, wherein the rigid core comprises at least one densified fiber batt and wherein the at least one densified fiber batt is comprised of a plurality of oriented multi-component fibers, wherein each of the plurality of multi-component fibers comprises at least first component having a first melting point and at least second component having a second melting point different from the first melting point; b) forming a decorative portion having a first surface and an opposed second surface; and c) affixing the second surface of the decorative portion to the first surface of the rigid core.

In still a further aspect, described herein is a method of making a layered composite article comprising: a) forming a rigid backing portion comprising a rigid core having a first surface and an opposed second surface, wherein the rigid core comprises at least one densified fiber batt and wherein the at least one densified fiber batt is comprised of a first plurality of oriented fibers comprising a natural fiber having a decomposition temperature and a second plurality of oriented fibers having a melting point lower than the decomposition temperature of the first plurality of oriented fibers; b) forming a decorative portion having a first surface and an opposed second surface; and c) affixing the second surface of the decorative portion to the first surface of the rigid core.

The step of forming the rigid backing portion can further comprise forming a rigid core comprising: a) overlaying the first plurality of oriented fibers and the second plurality of oriented fibers to form a fibrous matrix; b) treating the fibrous matrix to form a fiber batt; and c) heat and pressure treating the fiber batt under conditions effective to form the densified fiber batt.

In other aspects, a third plurality of oriented fibers can be present. In these aspects, the step of forming the rigid core can comprise: a) overlaying the first plurality of oriented fibers, the second plurality of oriented fibers and the third plurality of oriented fibers to form a fibrous matrix; b) treating the fibrous matrix to form a fiber batt; and c) heat and pressure treating the fiber batt under conditions effective to form the densified fiber batt. It should be understood that the first, second, and third plurality of oriented fibers can comprise any of fibers described herein.

It is further understood that any method known in the art that provides entanglement of the fibers can be utilized for forming the fiber batt. In some aspects, the step of treating can comprise a step of needlepunching. In other aspects, the step of treating can comprise a powder scattering process. In still other aspects, the step of treating can comprise any known process capable of forming a batt. In some aspects, the step of needlepunching is optional. In yet other aspects, the step of needlepunching can be replaced by a step of hydro entanglement, pneumatic entanglement, or any other method capable of holding fibers together, for example, a method of thermal bonding or use of additional adhesives.

In aspects where the step of treating comprises a powder scattering, the powder can be first scattered on the belt and the fibers can be overlaid on top of the powder. In further aspects, the components can be heat pressed together to form a batt. In such aspects, the scattered powder can comprise a polypropylene, a polyester, a polyethylene, or a combination thereof.

The methods described herein can again provide a densified fiber batt having a density of from about 5 lb/ft$^3$ to about 100 lb/ft$^3$, including exemplary densities of 10, 15, 20, 25, 30, 35, 40, 45, 50, 55, 60, 65, 70, 75, 80, 85, 90, and 95 lb/ft$^3$. In still further aspects, the volumetric density can be a value within any range derived from the above values, including for example, a density of from about 15 to about 75 pounds per cubic foot.

In certain aspects, the methods described herein provide a densified fiber batt having a density of at least about 10 lb/ft$^3$, including exemplary values of at least about 15 lb/ft$^3$, about 20 lb/ft$^3$, about 25 lb/ft$^3$, about 30 lb/ft$^3$, about 35 lb/ft$^3$, about 40 lb/ft$^3$, about 45 lb/ft$^3$, or about 50 lb/ft$^3$. In certain aspects, the densified fiber batt can have a density in a range between any two foregoing values.

In other aspects, the methods described herein provide a densified fiber batt having a density no greater than about 50 lb/ft$^3$, about 45 lb/ft$^3$, about 40 lb/ft$^3$, about 35 lb/ft$^3$, about 30 lb/ft$^3$, 25 lb/ft$^3$, about 20 lb/ft$^3$, about 15 lb/ft$^3$, or about 10 lb/ft$^3$. In certain aspects, the densified fiber batt can have a density in a range between any two foregoing values. It is understood that the densified batt can have a density as low as a density of a fiber batt comprising a substantially identical first plurality of oriented fibers and a substantially identical a second plurality of oriented fibers that has not undergone any densification processes, for example heating or pressurizing.

The methods described herein can provide a densified fiber batt having a density as low as a density of a fiber batt comprising a substantially identical first plurality of oriented fibers, a substantially identical a second plurality of oriented fibers, and a substantially identical a third plurality of oriented fibers that has not undergone any densification processes, for example heating or pressurizing.

In some aspects, described herein are methods that provide a rigid core as described herein, wherein the rigid core has a variable density across portions of the rigid core. For example, described herein are methods that can provide a rigid core comprising a first portion having a first density and a second portion having a second density different from the first density. To form such a rigid core having different densities, in some aspects, the ratio of the first and the second plurality of fibers can be manipulated to achieve a desired result. In other aspects, the ratio of the first, the second and the third plurality of fibers can be manipulated to achieve a desirable result.

In yet other aspects, the article can comprise a densified layer comprising non-fibrous composition. In such aspects, the densified layer can be disposed between the rigid core and the decorative portion.

It is understood that the first, second, and third plurality of fibers can be present in any foregoing amount or ratio.

In still further aspects, described herein are methods to provide a rigid backing portion of the inventive layered composite article having a variable density across the rigid core. These methods can comprise forming at least two separate densified fiber batts that are then layered adjacent each other. In these aspects, each of the densified batts can be formed by any method described herein and exhibit a density that can be same or different from another densified fiber batt.

In certain aspects, the step of overlaying the pluralities of oriented fibers can be performed by utilizing a card and cross lapping system, an airlay system, or a combination thereof.

It is understood that in some aspects, after the overlaying step, the step of forming the rigid core can further comprise needlepunching. In other aspects, after the overlaying step, the step of forming the rigid core can further comprise any methods known in the art, for example and without limitations, a step of powder scattering. In yet other aspects, the step of forming the rigid core further comprises heat and pressure treating at conditions effective to form the densified fiber batt.

Depending on the temperature at which the composite layer is heated, the use of heat resistant conveyer belts can be desired. Generally, the composite layer is heated to a temperature sufficient to at least partially melt the plurality of fibers having the lowest melting point. In some aspects, the heat treating conditions effective to form the densified fiber batt can comprise heating at a temperature of from about 180° F. to about 800° F., including exemplary temperatures of about 200° F., 250° F., 300° F., 350° F., 400° F., 450° F., 500° F., 550° F., 600° F., 700° F., and about 750° F. In yet other aspects, the heat treating conditions effective to form the densified fiber batt can comprise heating at a temperature from about 180° F. to about 350° F., about 250° F. to about 450° F., or about 250° F. to about 350° F., or about 350° F. to about 600° F.

In certain aspects, an oven can be utilized for heat treating. In yet other aspects, it is understood that any known in the art heating means can be utilized. For example, in some aspects, the fiber batt can be hot oil calendared. In still further aspects, the heat and pressure can come from continuous double belted presses, for example, commercially available from TPS, Sandvik, Meyer, HELD, Schott and Meissner, Meyer, HELD, or Hymmen. In yet other aspects, the heat and pressure can come from single and multiple opening static presses. In yet other aspects, the batt can be heated in a through air oven and then calendared.

During or after the heating step, the fiber batt can optionally be subjected to a pressure treating conditions effective to form the densified fiber batt. In these aspects, the fiber batt is subjected to a pressure from above 0 to about 1,200 pounds per square inch (psi), including for example, from about 10 psi to about 500 psi, 100 to 1,000 psi, from about 250 to 1,000 psi, from about 400 to about 950 psi, from about 500 to 750 psi, or from about 600 to 700 psi.

Figure 4:
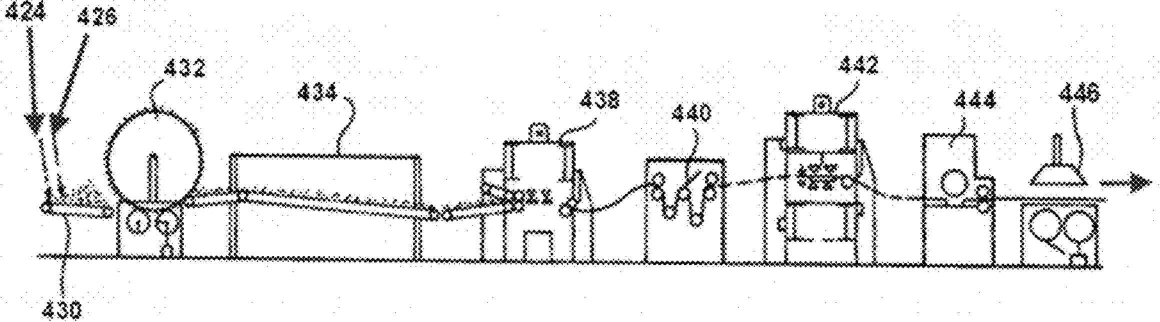
FIG. 4 is a schematic illustration of a process and apparatus for forming a high density composite according to various aspects of the present invention.

An exemplary apparatus suitable for making the layered composite articles is shown in FIG. 4. In a predetermined ratio, the first plurality of fibers and a second plurality of fibers are removed from the bundles 424, 426 and are manually or mechanically placed on a feed conveyor 430 as a loose oriented fiber mixture. The loose fiber mixture is initially moved through a textile card 432 which orients the fibers to form a fibrous matrix. Once carded, the fibrous matrix is moved into a cross-lapper 434 where the mat is cross-lapped into a predetermined number of layers. The cross-lapped fibrous matrix moves from the cross-lapper 434 through a tacker loom 438. The tacker loom 438 operates to loosely interconnect the matrix layers by means of barbed needle penetration to forma fiber batt. Following initial needlepunching by the tacker loom 438, the fabric batt can be optionally stretched by drafting on stretching rollers 440. After drafting, the optionally stretched fabric matt can be further moved through an additional main loom 442. The main loom 442 is operable to provide an additional barbed needle penetration. Following processing by the main loom 442, the fabric batt is moved through a calendar 444 where it is hot oil calendared between about 250 and 400° F., and 50 to 1,200 psi. Following calendar rolling, the fabric is can optionally pass through an additional heating station 448. At optional heating station 448, the fabric batt can be exposed to infrared heat at between about 150° F. and 350° F. Once the fabric batt is heated and optionally subjected to pressure, the formed densified fabric batt can then be cooled. It is understood that further steps can be carried out during the process, as desired.

In some aspects, the step of affixing of the decorative portion to the first surface of the rigid core can comprise applying an adhesive. In some aspects, it is understood that the adhesive material can be applied by any known in the art methods. In some aspects, the adhesive can be applied as a hot melt. In other aspects, the adhesive can be extruded on the densified fiber batt. In yet other aspects, the adhesive material can be applied as an aqueous dispersion.

In yet other aspects, the method further comprises applying a substrate layer as described above. The image substrate layer can be applied by any known methods, for example by nip roll method, or any lamination method known in the art.

In yet other aspects, the decorative portion can be affixed to the first surface of the rigid core by any other known in the art methods. In some methods the step of affixing comprises needling the second surface of the decorative portion with the first surface of the rigid core. In certain aspects, after the decorative portion adhered to the rigid core, the heat press can be applied at a temperature from about 110° C. to about 250° C. and under sufficient pressure to adhere the decorative portion to the rigid core. In yet other aspects, the decorative portion can be affixed to the first surface of the rigid core by needling. For example, the decorative portion comprising a plurality of whitened PET fibers as a decorative substrate or a decorative surface layer can be affixed to the first surface of the rigid core by needling. In other aspects, decorative portion affixed by needling can be further heat pressed to the first surface of the rigid core. It is understood that the image layer can be transferred to any visible surface of the article by any known in the art methods. In some aspects, the image layer can be formed by directly printing on the substrate after the decorative portion is affixed to the first surface of the rigid core. In yet other aspects, the image layer can be transferred by other methods that include but are not limited to rotogravure, digital and direct pad printing, screen printing, or sublimation after the decorative portion is affixed to the first surface of the rigid core.

In yet other aspects, the decorative portion can be affixed to the rigid core by using a polymer powder scattering. In such aspects, the powder can be scattered on the first surface of the rigid core prior to affixing the second surface of the decorative portion. In still further aspects, the decorative portion affixed by powder scattering can be further heat pressed to the first surface of the rigid layer.

In yet other aspects, the method further comprises a step of applying a wear layer having a first surface and an opposed surface. In still further aspects, the wear layer overlies the decorative portion such that a second surface of the wear layer is in contact with the first surface of the decorative portion. It is understood that the wear layer can be applied by any known in the art methods. In some aspects, the wear layer is applied by a nip roll method. In these aspects, the wear layer is applied to the decorative layer and is laminated by passing through an additional nip roller. In other aspects, the wear layer can be UV cured.

For example, the top surface of the decorative layer can optionally be post pressed, smoothed, embossed or contoured to obtain various functional or aesthetic effects.

Additionally, other optional materials can be applied to composite layer or the formed composite during the manufacturing process.

In connection with any of the inventive aspects described herein, the methods can optionally comprise a sanitization step. As one of skill in the art will appreciate, the presence of impurities in reclaimed carpet material can necessitate a need to sanitize the reclaimed materials for health and safety purposes. To that end, the plurality of fibers can be subjected to a sanitization step at any point during the manufacture: sanitizing the plurality of fibers prior to its use in the methods described herein or alternatively by sanitizing the plurality of fibers during or after formation of the composite.

In various aspects, the layered composite articles of the present invention advantageously exhibit higher radiant panel ratings, reduced squeakiness, improved sound reduction properties and less embodied energy.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

Unless indicated otherwise, parts are parts by weight, temperature is degrees C. or is at ambient temperature, and pressure is at or near atmospheric or full vacuum.

Example 1

Exemplary articles have been prepared according to the methods described above. The plurality of oriented multi-component fibers and the plurality of single-component fibers have been used to form the inventive densified fiber batt. The exemplary multi-component fibers had a core-sheath configuration, wherein the core was polyester having the first melting point and a sheath was polyester having the second melting point lower than the first melting point. The exemplary single-component fibers comprised polyester having the first melting point. The exemplary densified fiber batt comprised 60% by weight of the multi-component fiber and 40% by weight of the single-component fiber.

The exemplary samples having a weight of 60 oz/sq. yard and 90 oz/sq. yard were placed on a bottom platen of a static press; a frame having a thickness of 0.080 or 0.125 inch was placed around the sample and a top platen of a static press was lowered to contact the frame. Both top and bottom platens were heated to a temperature of 270° F. or 325° F. The resulting density of the densified fiber batt was measured and is shown in Table 1.

The exemplary articles have been also tested for static load stability. To measure a static load, 2"×2" specimens have been prepared. The top of the clean specimen have been marked diagonally to make an "X." The initial thickness (T1) of the specimen at the center of the "X" was measured. The specimen has been place face up on a bottom indenter plate and an intermediate plate has been placed on top of specimen with the 1.25" diameter circle face down. The desired weight of 750 lbs or 1,500 lbs is applied for 24 hours. Upon removal of weight the compressed thickness (T2) was measured and recorded at the center of the "X." The recovered thickness (T3) of the specimen at the center of the "X" was further measured after additional 24 hours when the specimen was not exposed to any external loads. The residual compression was calculated as: n=T1−T3. The results are presented in Table 2. The specimen does not pass the test if static load is >0.005 inches. All inventive specimens passed the test.

To measure a residual indent, 2"×2" specimens have been prepared. The top of the clean specimen have been marked diagonally to make an "X." The specimen has been placed under the presser foot (0.178" diameter) with the center of the "X" directly under the presser foot. The initial thickness of specimen (T1) has been measured using the digimatic indicator on the Indention Tester. To measure the residual indent, the digimatic indicator with presser foot resting on top of specimen has been zeroed. The weight of 140 lbs. was applied to the specimen for 10 min and T2 thickness was measured. Then, the specimen was removed and left untouched for 1 hour, and final thickness of the specimen (T3) has been measured using the digimatic indenter with the presser foot lined p with the previous mark. The residual indent % was measures as: residual indent %=((T1−T3)/T1)×100. Specimen fails if residual indent %>8%. The results are presented in Tables 3-6. All inventive specimens passed the test.

To measure dimensional stability, 6"×6" specimens have been prepared and measured according to ISO 23999 standard. The dimensional stability of the specimens has been measured in both machine direction and across machine direction. The specimens have been subjected to 176° F. for 6 hours and then allowed to rest for 24 hour. The specimen then has measured again in same spot to calculate % of change in dimension. A passing test is 0.17% or less change. The results are presented in Table 7.

TABLE 1

Density of Exemplary Fiber Batts.

| Fiber Batt | Density |
|---|---|
| PET 60 oz, 0.125 inch frame, 270° F. | 0.768 g/cm$^3$ or 47.9 lb/ft$^3$ |
| PET 90 oz, 0.125 inch frame, 325° F. | 1.004 g/cm$^3$ or 62.7 lb/ft$^3$ |

TABLE 2

Static Load Measurements for Exemplary Fiber Batts.

| Sample ID | T1 (in) | T2 (in) | T3 (in) | N = T1-T3 | Percent, % |
|---|---|---|---|---|---|
| PET 60 oz, 0.080 inch frame, 270° F. | 0.1075 | 0.1030 | 0.1045 | −0.0030 | −2.79 |
| PET 60 oz, 0.080 inch frame, 325° F. | 0.1120 | 0.1105 | 0.1115 | −0.0005 | −0.45 |
| PET 90 oz, 0.125 inch frame, 270° F. | 0.1440 | 0.1415 | 0.1430 | −0.0010 | −0.69 |
| PET 90 oz, 0.125 inch frame, 325° F. | 0.1575 | 0.1565 | 0.1570 | −0.0005 | −0.32 |

TABLE 3

Residual Indent for Exemplary Fiber Batts.

| PET 60 oz, 0.080 inch frame, 270° F. | 1 | 2 | 3 |
|---|---|---|---|
| Product Thickness (in) T1 | 0.101 | 0.102 | 0.101 |
| After (in) T2 | 0.018 | 0.0155 | 0.014 |
| After 1 h (in) T3 | 0.1005 | 0.101 | 0.101 |
| Indentation (in) = T1-T2 | 0.083 | 0.0865 | 0.087 |
| Residual Indentation (in) = T1-T3 | 0.0005 | 0.001 | 0 |

TABLE 3-continued

| Residual Indent for Exemplary Fiber Batts. | | | |
|---|---|---|---|
| PET 60 oz, 0.080 inch frame, 270° F. | 1 | 2 | 3 |
| Residual Indent % | −0.50 | −0.98 | 0 |
| Average Residual Indent % | −0.49 | | |

TABLE 4

| Residual Indent for Exemplary Fiber Batts. | | | |
|---|---|---|---|
| PET 60 oz, 0.080 inch frame, 325° F. | 1 | 2 | 3 |
| Product Thickness (in) T1 | 0.1155 | 0.119 | 0.1195 |
| After (in) T2 | 0.01 | 0.0135 | 0.0105 |
| After 1 h (in) T3 | 0.11 | 0.118 | 0.117 |
| Indentation (in) = T1-T2 | 0.1055 | 0.1055 | 0.109 |
| Residual Indentation (in) = T1-T3 | 0.0055 | 0.001 | 0.0025 |
| Residual Indent % | −4.76 | −0.84 | −2.09 |
| Average Residual Indent % | −2.56 | | |

TABLE 5

| Residual Indent for Exemplary Fiber Batts. | | | |
|---|---|---|---|
| PET 90 oz, 0.125 inch frame, 270° F. | 1 | 2 | 3 |
| Product Thickness (in) T1 | 0.1415 | 0.138 | 0.1425 |
| After (in) T2 | 0.023 | 0.021 | 0.022 |
| After 1 h (in) T3 | 0.1375 | 0.137 | 0.138 |
| Indentation (in) = T1-T2 | 0.1185 | 0.117 | 0.1205 |
| Residual Indentation (in) = T1-T3 | 0.004 | 0.001 | 0.0045 |
| Residual Indent % | −2.83 | −0.72 | −3.16 |
| Average Residual Indent % | −2.24 | | |

TABLE 6

| Residual Indent for Exemplary Fiber Batts. | | | |
|---|---|---|---|
| PET 90 oz, 0.125 inch frame, 325° F. | 1 | 2 | 3 |
| Product Thickness (in) T1 | 0.153 | 0.1595 | 0.154 |
| After (in) T2 | 0.0125 | 0.013 | 0.012 |
| After 1 h (in) T3 | 0.1515 | 0.1585 | 0.151 |
| Indentation (in) = T1-T2 | 0.1405 | 0.1465 | 0.142 |
| Residual Indentation (in) = T1-T3 | 0.0015 | 0.001 | 0.003 |
| Residual Indent % | −0.98 | −0.63 | −1.95 |
| Average Residual Indent % | −1.19 | | |

TABLE 7

| Dimensional Stability of Exemplary Fiber Batts. | |
|---|---|
| Fibers | Dimensional Stability (% linear change) |
| PET 0.080 inch frame, 270° F. | −0.08% against machine direction |
| PET 0.080 inch frame, 270° F. | −0.11% machine direction |
| PET 0.125 inch frame, 270° F. | −0.10% against machine direction |
| PET 0.125 inch frame, 270° F. | −0.09% machine direction. |

To measure flexural modulus and flexural strength, the testing is performed according to ASTM D790 standard. For this testing, a specimen of ⅛"×½"×5" is placed on two supports and a load is applied at the center. The load at yield is the sample material's flexural strength. The flexural strength can be also measured according to the ISO-178 standard. It is understood that the values reported in the ASTM D-790 and ISO-178 tests seldom differ significantly. The material modulus is also measured according to ASTM D-790 or ISO-178 and is expressed as a ratio of stress to strain in flexural deformation. Typical flexural strength and flexural modulus of various polymers is listed in Table 8 below. It is understood that flexible material such as elastomers have lower values than fiber reinforced engineering polymers used as metal substitutes such as polyimides or acetals.

TABLE 8

| Typical Flexural Strength and Flexural Modulus of Polymers | | |
|---|---|---|
| Polymer Type | Flexural Strength, MPa | Flexural Modulus, GPa |
| ABS | 75 | 2.5 |
| ABS + 30% Glass Fiber | 120 | 7 |
| Acetal Copolymer | 85 | 2.5 |
| Acetal Copolymer + 30% Glass Fiber | 150 | 7.5 |
| Acrylic | 100 | 3 |
| Nylon 6 | 85 | 2.3 |
| Polyamide-Imide | 175 | 5 |
| Polycarbonate | 90 | 2.3 |
| Polyethylene, MDPE | 40 | 0.7 |
| Polyethylene Terephthalate (PET) | 80 | 1 |
| Polyimide | 140 | 3 |
| Polyimide + Glass Fiber | 270 | 12 |
| Polypropylene | 40 | 1.5 |
| Polystyrene | 70 | 2.5 |

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A layered composite article, comprising:

a) a rigid backing portion comprising a rigid core having a first surface and an opposed second surface, wherein the rigid core comprises a first needle-punched densified fiber batt and a second needle-punched densified fiber batt, wherein the first needle-punched densified fiber batt and the second needle-punched densified fiber batt have different densities, wherein the first needle-punched densified fiber batt comprises a respective second plurality of fibers and at least 30% by weight of a respective first plurality of fibers, wherein the first plurality of fibers of the first needle-punched densified fiber batt being multi-component fibers and having a melting point different from a melting point of the second plurality of fibers of the first needle-punched densified fiber batt, wherein the second needle-punched densified fiber batt comprises a respective second plurality of fibers and a respective first plurality of fibers, wherein the first plurality of fibers of the second needle-punched densified fiber batt being multi-component fibers and having a melting point different from a melting point of the second plurality of fibers of the second needle-punched densified fiber batt, wherein the rigid core comprises at least 30% by weight of multi-component fibers, and;

b) a decorative portion having:

a first surface and an opposed second surface, and an aesthetic layer and a wear layer, wherein the aesthetic layer defines the opposed second surface of the decorative portion and is directly affixed to a first surface of the first needle-punched densified fiber batt, and wherein the wear layer is affixed to a first surface of the aesthetic layer, and wherein the first surface of the rigid core is the first surface of the first needle-punched densified fiber batt.

2. The layered composite article of claim 1, wherein the affixed decorative portion has a has a thickness of from about 1 mil to about 20 mils.

3. The layered composite article of claim 1, wherein the aesthetic layer comprises a veneer of slate, ceramic, stone, wood, cork, a film, a woven, or a nonwoven material.

4. The layered composite article of claim 1, wherein the first at needle-punched densified fiber batt has a thickness from about 1.5 mm to about 5 mm.

5. The layered composite article of claim 1, wherein the first needle-punched densified fiber batt has a density from about 40 lb/ft$^3$ to about 100 lb/ft$^3$.

6. The layered composite article of claim 1, wherein multi-component fibers of the first plurality of fibers of the of the first needle-punched densified fiber batt have a core-sheath configuration.

7. The layered composite article of claim 1, wherein the first needle-punched densified fiber batt comprises at least 40% by weight of the plurality of multi-component fibers.

8. The layered composite article of claim 1, wherein the multi-component fibers of the first plurality of fibers of the first needle-punched densified fiber batt are multi-component polyester fibers having a core-sheath configuration and the second plurality of fibers of the first needle-punched densified fiber batt are mono-component polyester fibers.

9. The layered composite article of claim 1, wherein the wear layer comprises polyethylene terephthalate (PET), polyurethane, polyurethane reactive hotmelt adhesive (PUR) polypropylene, polytrimethylene terephthalate (PTT), polyamide, polyvinyl chloride (PVC), surlyn resin, heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), high density polyethylene (HDPE), low density polyethylene (LDPE), or a copolymer thereof.

10. The layered composite article of claim 1, wherein the aesthetic layer comprises a veneer of slate, ceramic, stone, wood, cork, a film, or a woven material.

11. The layered composite article of claim 1, wherein the decorative portion further comprises a scratch layer affixed to a first surface of the wear layer.

12. The layered composite article of claim 11, wherein the scratch layer is a UV cured scratch layer.

13. The layered composite article of claim 1, wherein the wear layer is a UV cured wear layer.

14. The layered composite article of claim 1, wherein the wear layer comprises polyurethane.

15. The layered composite article of claim 1, wherein the opposed second surface of the rigid core defines an outer most surface of the layered composite article and wherein the opposed second surface of the rigid core does not contact an additional layer in the layered composite article.

16. The layered composite article of claim 1, wherein the second surface of the decorative portion is a film comprising oriented polypropylene (OPP), polyolefin (PO), woven polyethylene (PE), non-woven PE, woven polypropylene (PP), nonwoven PP, woven PET, whitened fiber PET, nonwoven PET, a heat stabilized biaxially-oriented PET (BoPET), amorphous PET (aPET), recycled PET (rPET), polyethylene terephthlate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPS), polycarbonate, polyethylene (PE), or a copolymer thereof.

17. The layered composite article of claim 1, wherein the second surface of the decorative portion is a film comprising PET.

18. The layered composite article of claim 1, wherein all fibers in the first needle-punched densified fiber batt are selected from a group consisting of polyester, polypropylene, polyethylene, polyamides, polyurethane, polylactic acid, acetal, co-polyester, co-polyamide, polystyrene, or a combination thereof.

* * * * *